US007905616B2

United States Patent
Konno et al.

(10) Patent No.: US 7,905,616 B2
(45) Date of Patent: Mar. 15, 2011

(54) ILLUMINATION UNIT AND DISPLAY UNIT INCORPORATING THE SAME

(75) Inventors: Akitoyo Konno, Hitachi (JP); Yoshifumi Sekiguchi, Hitachiota (JP); Makoto Tsumura, Hitachi (JP); Ikuo Hiyama, Hitachinaka (JP); Daisuke Kajita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 12/191,369

(22) Filed: Aug. 14, 2008

(65) Prior Publication Data
US 2009/0059121 A1  Mar. 5, 2009

(30) Foreign Application Priority Data

Sep. 5, 2007 (JP) .................................. 2007-229917

(51) Int. Cl.
G09F 13/04 (2006.01)
G09F 13/08 (2006.01)
F21V 7/04 (2006.01)
F21V 21/00 (2006.01)
G02F 1/1333 (2006.01)

(52) U.S. Cl. .................... 362/97.1; 362/632; 362/217.1; 349/64

(58) Field of Classification Search .................. 362/97.1, 362/97.2, 223, 224, 217.1, 217.11, 611, 612, 362/614, 632, 633, 634; 349/56, 58, 61, 349/62, 64, 67, 70
See application file for complete search history.

(56) References Cited

U.S. PATENT DOCUMENTS

| | | | |
|---|---|---|---|
| 6,313,891 B1 * | 11/2001 | Nagakubo et al. | 349/65 |
| 7,056,003 B2 * | 6/2006 | Mai | 362/609 |
| 7,134,767 B2 * | 11/2006 | Liao et al. | 362/225 |
| 7,259,810 B2 * | 8/2007 | Kim | 349/67 |
| 7,384,179 B2 * | 6/2008 | Sakai | 362/632 |
| 7,651,241 B2 * | 1/2010 | Lee | 362/223 |
| 2005/0083711 A1 * | 4/2005 | Wu et al. | 362/558 |
| 2006/0176420 A1 * | 8/2006 | Choi et al. | 349/62 |
| 2007/0047264 A1 | 3/2007 | Joo et al. | |
| 2007/0147090 A1 * | 6/2007 | Hung | 362/632 |

FOREIGN PATENT DOCUMENTS

| | | |
|---|---|---|
| CN | 1920643 A | 2/2007 |
| JP | 08-076123 | 3/1996 |
| JP | 08-179318 | 7/1996 |
| JP | 10-125122 | 5/1998 |
| JP | 2004-235092 | 8/2004 |
| JP | 2005-123087 | 5/2005 |
| JP | 2007-018423 | 1/2007 |
| JP | 2007059406 | 3/2007 |
| WO | WO 2006134741 A1 * | 12/2006 |

* cited by examiner

*Primary Examiner* — Jong-Suk (James) Lee
*Assistant Examiner* — David R Crowe
(74) *Attorney, Agent, or Firm* — Antonelli, Terry, Stout & Kraus, LLP.

(57) ABSTRACT

An illumination device has at least one fluorescent tube, a lower frame supporting the fluorescent tube, a light diffusion plate which opposes the lower frame with the fluorescent tube being interposed therebetween for forward diffusion of output light of the fluorescent tube, a reflection sheet disposed along the fluorescent tube side of the lower frame for reflecting the fluorescent light toward the light diffuser plate, and an upside reflector covering an electrode of the fluorescent tube for reflecting the light toward the light diffuser. When letting a direction along a length of the fluorescent tube be a horizontal direction, a distance between the fluorescent tube and the reflection sheet at at least one of nearby portions of right and left ends of the illuminator is greater than such distance at a central portion thereof. A liquid crystal display (LCD) apparatus using the illuminator is also disclosed.

22 Claims, 14 Drawing Sheets

ENLARGED CROSS-SECTIONAL VIEW ALONG LINE G-G OF

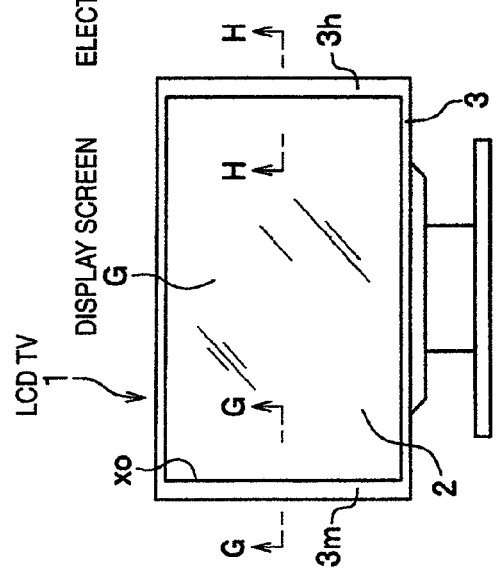
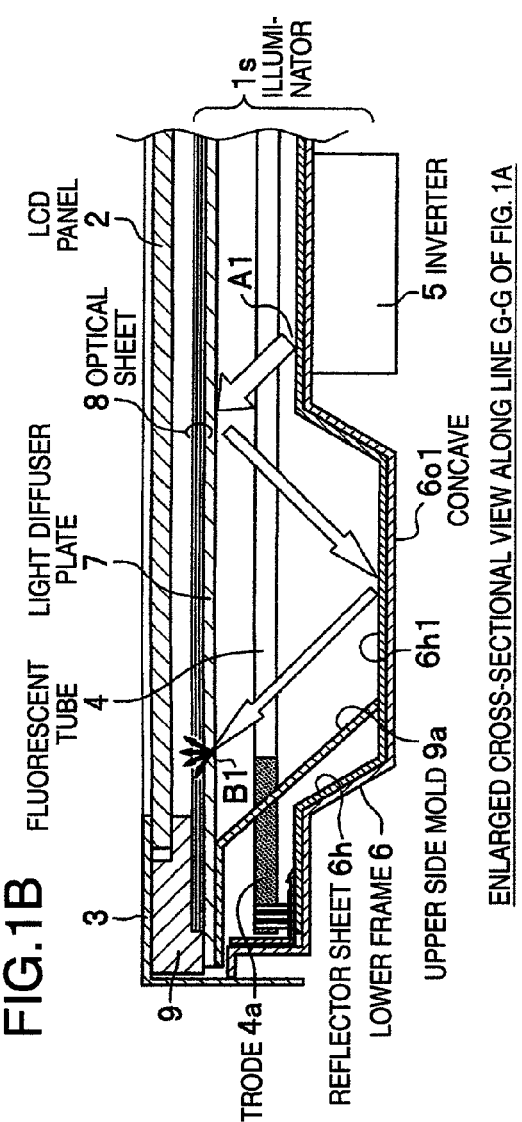
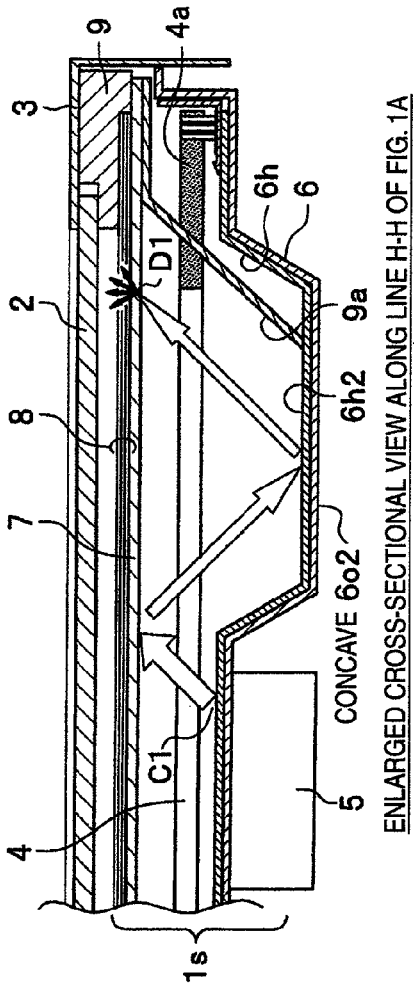

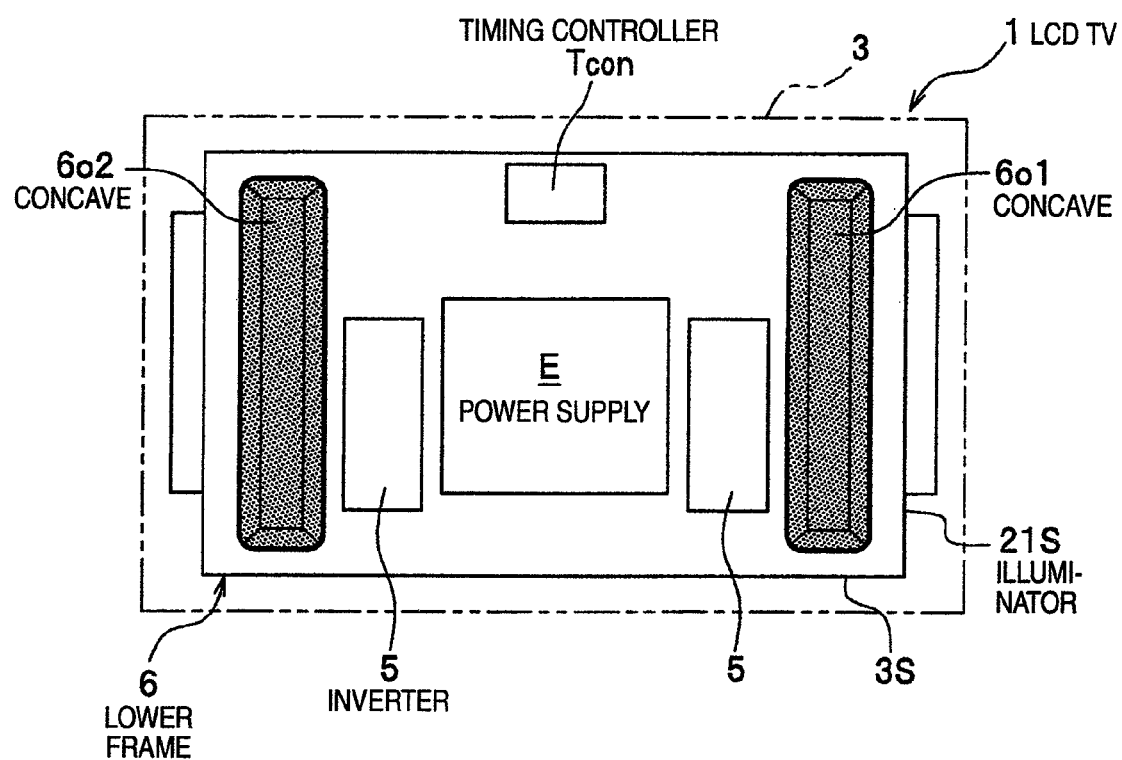

SECOND EMBODIMENT
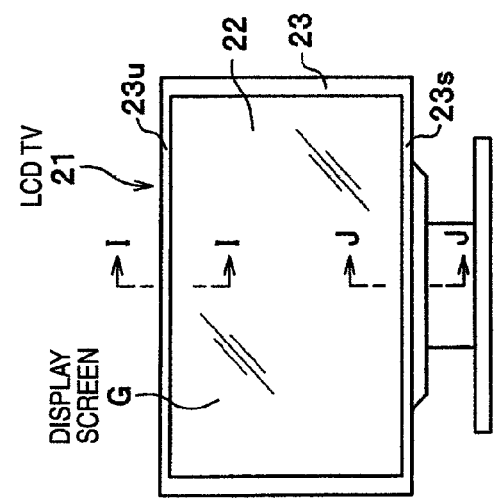

MAIN-PART BACK VIEW OF LCD TV 21 OF FIG. 4A

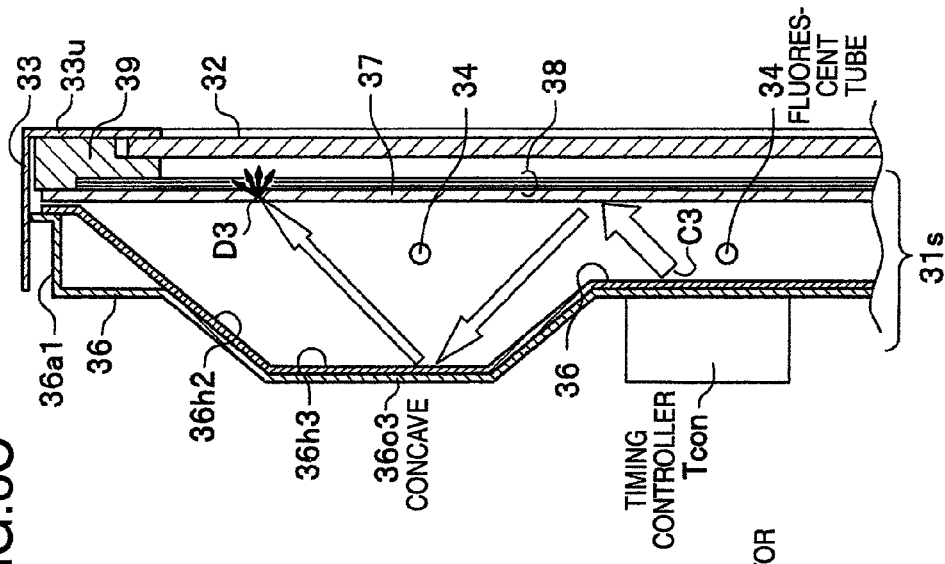
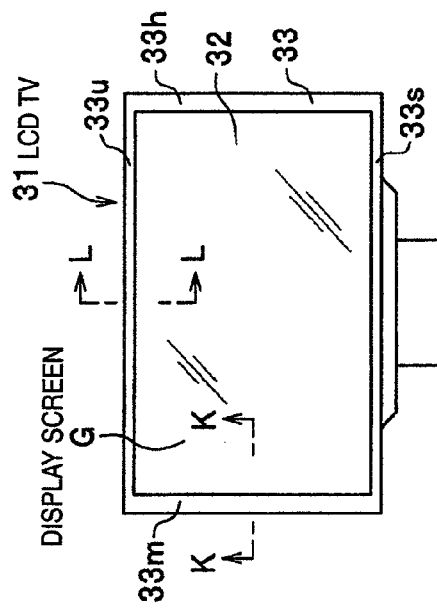
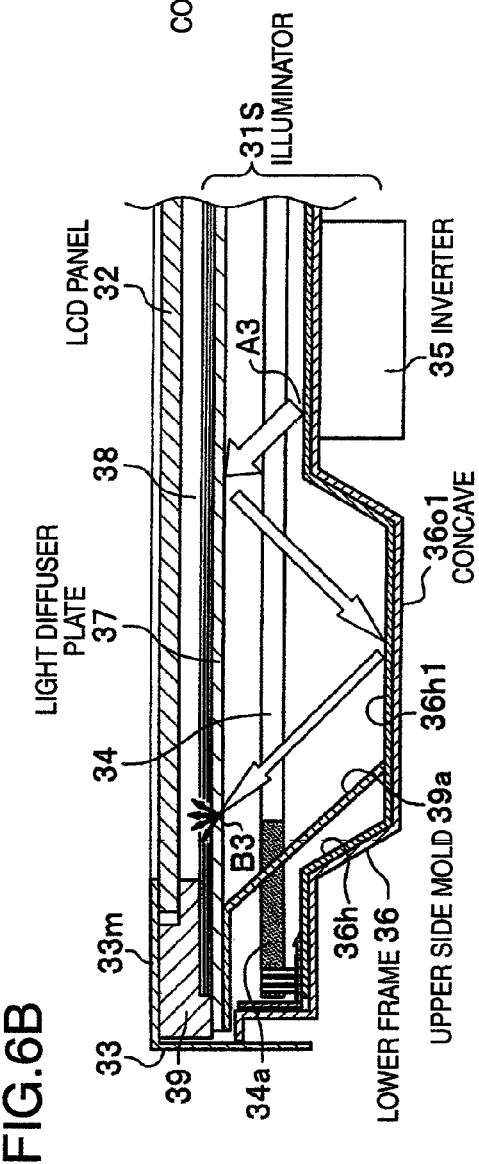

MAIN-PART BACK VIEW OF LCD TV 31 OF FIG. 6A

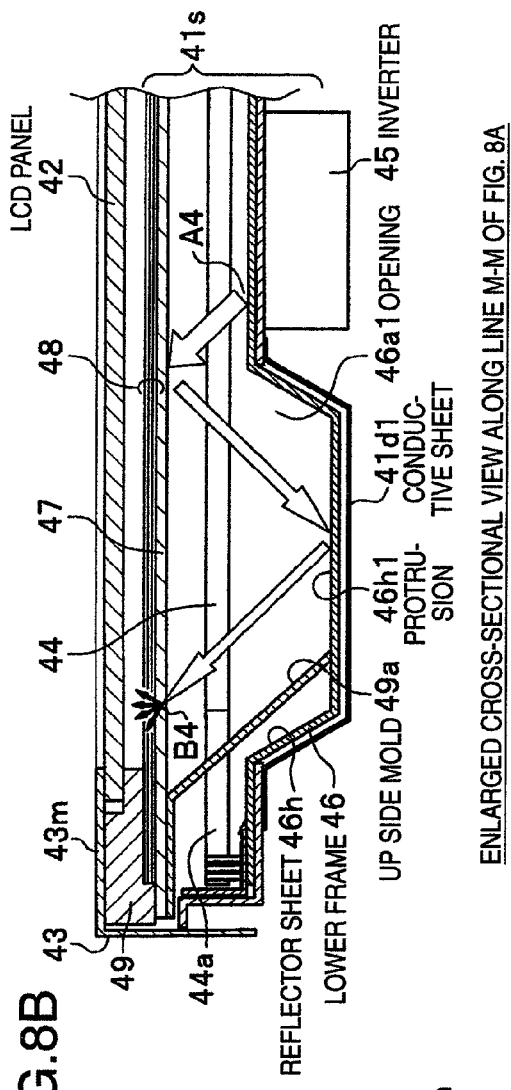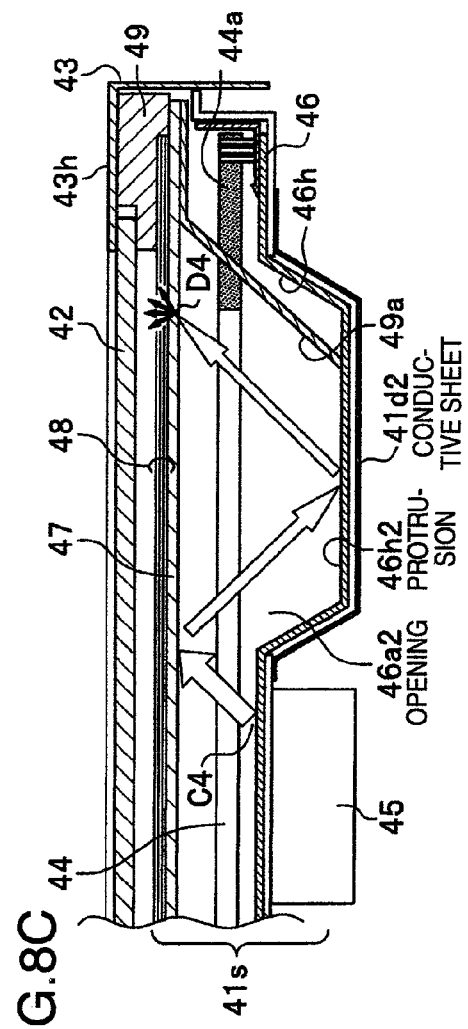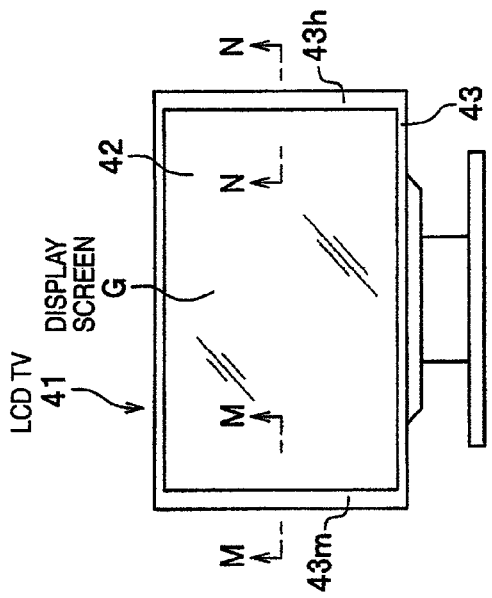

MAIN-PART BACK VIEW OF LCD TV 41 OF FIG. 8A

ENLARGED CROSS-SECTIONAL VIEW ALONG LINE G-G OF FIG. 1A

DIAGRAM SHOWING PRINT PATTERN AT "O" PART OF FIG. 11A

DIAGRAM SHOWING PRINT PATTERN AT "P" PART OF FIG. 11A

ENLARGED CROSS-SECTIONAL VIEW ALONG LINE E-E OF FIG. 12A

ENLARGED CROSS-SECTIONAL VIEW
ALONG LINE F-F OF FIG. 12B

ENLARGED CROSS-SECTIONAL VIEW OF LCD TV 101 OF FIG. 12A

ILLUMINATION UNIT AND DISPLAY UNIT INCORPORATING THE SAME

BACKGROUND OF THE INVENTION

The present invention relates to an illumination device using one or more fluorescent tubes, and also relates to a liquid crystal display (LCD) apparatus using the illumination device.

FIG. 12A shows a front view of one prior known LCD television (TV) receiver 101, and FIG. 12B is a back view showing main parts of the LCD TV shown in FIG. 12A on a backface thereof.

In addition, FIG. 13A is an enlarged cross-sectional view of the LCD TV as taken along a line E-E of FIG. 12A, and FIG. 13B is its enlarged cross-sectional view taken along a line F-F of FIG. 12A.

As shown in FIG. 12A, the prior art LCD TV 101 has a display screen G for visual display of video images thereon. When displaying a video image on this display screen G, light is emitted for transmission to an LCD panel 102 (see FIGS. 13A and 13B) from its backside, and the panel is voltage-controlled in accordance with the video image, resulting in the image being displayed on the screen.

As shown in FIGS. 13A and 13B, this LCD TV 101 is generally made up of the LCD panel 102 and an illumination device 101S which is placed behind the LCD panel 102 for supplying light to the LCD panel 102 from its backside (rear surface side of drawing sheet of FIG. 12A). The LCD panel 102 is rigidly attached to the illumination device 101S by an upper frame 103.

The LCD panel 102 changes the transmissivity of the light that passes through a liquid crystal (LC) layer in a way corresponding to respective pixels constituting the image to be displayed, thereby controlling the transmission and non-transmission of the light from the illumination device 101S for displaying the image on the display screen G (see FIG. 12A) by a transmission degree of the light of a color filter.

FIG. 14 is an exploded view of the LCD TV 101 shown in FIG. 12A when looking at from its front side (top face side of drawing sheet of FIG. 12A).

As shown in FIG. 14, the illumination device 101S (see FIGS. 13A and 13B) has a plurality of fluorescent tubes 104 for use as a light source unit, an inverter 105 for driving the fluorescent tubes 104, a lower frame 106 for disposing the fluorescent tubes 104, a reflection sheet 106h which is disposed along a front face of the lower frame 106 for reflecting light rays of the fluorescent tubes 104 toward the LCD panel 102 side, a light diffusion plate 107 for diffusing the light as output from the fluorescent tubes 104, an optical sheet 108 for control of an angular distribution or the like of the light that enters the LCD panel 102, an intermediate mold frame 109 which fastens the optical sheet 108 and light diffusion plate 107 to the lower frame 106 and which mounts thereon the LCD panel 102, and an upside mold 110 which functions as a light shield wall of right and left end portions of the display screen.

Note here that FIG. 14 shows main parts or components only, and there are many other members.

As shown in FIG. 12B, several structural members are disposed on the non-display plane side of the LCD TV 101, and the members include circuit components, such as a timing controller Tcon, the inverter 105, a power supply unit 111 and others.

Additionally, prior art bulletins of the invention in relation to this application include JP-A-2007-59406 (in its paragraphs [0022] to [0024]) and JP-A-2007-18423.

JP-A-2007-59406 discloses therein a display apparatus of the type using an external electrode fluorescent lamp as a back-light thereof. JP-A-2007-18423 teaches a display device which uses an internal electrode fluorescent lamp as its backlight: in FIG. 8 of this Japanese patent bulletin, a similar arrangement to that shown in FIG. 13A of the present application is depicted.

SUMMARY OF THE INVENTION

Incidentally, FIG. 13A shows an illumination device 103 which is equivalent in structure to a thickness-reduced or "thinned" version of the prior art illumination device, i.e., an arrangement with a light diffusion distance being shortened.

As indicated by arrows in FIG. 13A, output light emitted from the fluorescent tubes 104 enters the reflection sheet 106h and light diffusion plate 107, and undergoes diffused reflection; further, such light enters the reflection sheet 106h or the light diffusion plate 107. By repeating this procedure, the light expands within a light diffusion space K which is surrounded by the light diffusion plate 107, upside mold 110 and reflection sheet 106h.

It should be noted that the diffused reflection denotes that incident light from a given direction is reflected at every possible angle. On the contrary, regular reflection refers to a phenomenon that incoming light at an angle of incidence is reflected at a specific angle which is the same as the angle of incidence.

As both the reflection sheet 106h and the light diffusion plate 107 have diffused reflection planes, each of them undergoes diffused reflection. In particular, the light diffusion plate 107 functions to cause the incident light to undergo diffused reflection to return to inside of the light diffusion space K while at the same time permitting a certain amount of light to pass therethrough to the LCD panel 102 side.

In FIG. 13A, a route along which the light that emitted from a point "A" of the fluorescent tube 104 travels from a point B of the light diffusion plate up to the surface of LCD panel 102 is indicated by arrows, wherein the width or "fatness" of an arrow corresponds to the intensity of the light.

As previously stated, light undergoes diffused reflection, so that this is not simply representable by such a single arrow. However, FIG. 13A shows, for purposes of convenience in illustration herein, a light ray that is emitted at an angle of 45 degrees chosen or "picked up" from those light rays that have emitted from the point A and are incident on the reflection sheet 106h at the angle of 45 degrees and then undergo the diffused reflection. Similarly, since the light as reflected from the reflection sheet 106h at the angle of 45 degrees is incident on the light diffusion plate 107 at the angle of 45 degrees, a light ray which is reflected at 45 degrees is picked up from those rays which are diffused and reflected at the light diffusion plate 107.

As the incoming light from a certain direction is reflected to all possible directions, reflection light at a specific angle decreases in light intensity with respect to its corresponding incident light (i.e., arrow becomes slimmer). In other words, the thinner the illumination device 101S, the greater the frequency of reflection: the more the frequency of reflection, the less the light intensity.

In FIG. 13A, five reflections undergo repeatedly for traveling from the point A to reach the point B. As previously stated, the incoming light from the center side becomes weaker at the right and left end portions including the point B; thus, there is a problem that it becomes darker.

When the illumination device 101S gets darker at its ends, this poses a problem that the right and left end portions Gr, Gl (see FIG. 12A) of the display screen G for displaying video images on the LCD panel 102 become darker.

One known approach to solving this problem is to enlarge the illumination device 101S for increasing its lateral size to thereby exclude such dark portions in the right and left part regions of the illumination device 101S from the display screen G. Unfortunately, this approach is faced with a problem that right and left bezel parts 101g, 101g (see FIG. 12A) become larger, resulting in significant failure of design properties and also in degradation of commodity values.

Similarly, FIG. 13B shows a route along which the output light that emitted from a point "C" of the fluorescent tube 104 travels from a point D of the light diffusion plate to the surface of LCD panel 102 is indicated by arrows, wherein the width of each arrow corresponds to the intensity of light.

The thinner the illumination device 101S, the greater the frequency of reflection at the reflection sheet 106h and light diffusion plate 107: the more the reflection frequency, the less the light intensity. In FIG. 13B, five reflections are repeated for traveling from the point C to the point D. This causes a problem that the point D-containing upper end and lower end become darker because of the fact that the incoming light from the center side becomes weaker.

When the illumination device 101S gets darker at these ends, this poses a problem that regions of the upper and lower end portions Gv, Gs (see FIG. 12A) of the display screen G for displaying video images on the LCD panel 102 become darker.

As stated above, in the case of reducing the body thickness of the illumination device 101S of the LCD TV 101, there is a technical problem to be solved: the right and left ends Gr, Gl and upper and lower ends Gv, Gs of the display screen G, which is an image display area, decrease in brightness.

This invention has been made in view of the above-stated background, and its object is to provide an illumination device capable of improving the brightness or luminance of the upper and lower end portions and/or the right and left end part regions without having to increase the width of bezel part around the display screen, and also provide a display apparatus using the illumination device.

To attain the foregoing object, in accordance with a first aspect of this invention, an illumination device is provided, which includes at least one fluorescent tube, a lower frame member supporting the fluorescent tube, a light diffusion plate disposed to oppose the lower frame member with the fluorescent tube being interposed therebetween for diffusing light of the fluorescent tube toward an anterior object to be illuminated, a reflection sheet member disposed along the fluorescent tube side of the lower frame member for reflecting the light of the fluorescent tube toward the light diffusion plate, and an upside reflection member for covering an electrode of the fluorescent tube and for reflecting the light of the fluorescent tube to the light diffusion plate, wherein letting a lengthwise direction of the fluorescent tube be a transverse direction, a distance between the fluorescent tube and the reflection sheet member at at least one of portions adjacent to the right and left ends of the illumination device is greater than such distance at a central portion thereof.

In accordance with a second aspect of this invention, an illumination device includes at least one fluorescent tube, a lower frame member supporting the fluorescent tube, a light diffusion plate disposed to oppose the lower frame member with the fluorescent tube being interposed therebetween for diffusing light of the fluorescent tube toward an anterior object to be illuminated, a reflection sheet member disposed along the fluorescent tube side of the lower frame member for reflecting the light of the fluorescent tube toward the light diffusion plate, and an upside reflection member for covering an electrode of the fluorescent tube and for reflecting the light of the fluorescent tube to the light diffusion plate, wherein when letting a direction along an extending surface direction of the reflection sheet member and perpendicular to a lengthwise direction of the fluorescent tube be an up-and-down direction, a distance between the fluorescent tube and the reflection sheet member at at least one of portions adjacent to the upper and lower ends of the illumination device is greater than the distance at a central portion thereof.

In accordance with a third aspect of the invention, an illumination device has at least one fluorescent tube, a lower frame member supporting the fluorescent tube, a light diffusion plate disposed to oppose the lower frame member with the fluorescent tube being interposed therebetween for diffusing light of the fluorescent tube toward an anterior object to be illuminated, a reflection sheet member disposed along the fluorescent tube side of the lower frame member for reflecting the light of the fluorescent tube toward the light diffusion plate, and an upside reflection member for covering an electrode of the fluorescent tube and for reflecting the light of the fluorescent tube to the light diffusion plate, wherein when letting a lengthwise direction of the fluorescent tube be a transverse direction and letting a direction along an extending surface direction of the reflection sheet member and perpendicular to the lengthwise direction of the fluorescent tube be an up-and-down direction, a distance between the fluorescent tube and the reflection sheet member at any one of portions adjacent to the upper and lower ends and the right and left ends of the illumination device is greater than the distance at a central portion thereof.

In accordance with a fourth aspect of this invention, a display apparatus is provided, which is arranged to use any one of the above-stated illumination devices incorporating the principles of the invention.

According to this invention, it is possible to make brighter the right and left end portions or the upper and lower ends of the illumination device without increasing the width of the bezel part around the display screen.

Other objects, features and advantages of the invention will become apparent from the following description of the embodiments of the invention taken in conjunction with the accompanying drawings.

BRIEF DESCRIPTION OF THE DRAWINGS

FIG. 1A is a diagram showing a front view of a liquid crystal display (LCD) television (TV) receiver in accordance with a first embodiment of this invention, FIG. 1B is an enlarged cross-sectional view of the LCD TV as taken along a line G-G of FIG. 1A, and FIG. 1C is an enlarged cross-sectional view of the LCD TV as taken along a line H-H of FIG. 1A.

FIG. 3 is a back view for showing main part of the LCD TV shown in FIG. 1A on a back face thereof.

FIG. 4B is an enlarged cross-sectional view of the LCD TV as taken along a line I-I of FIG. 4A, and FIG. 4C is an enlarged cross-sectional view of the LCD TV taken along a line J-J of FIG. 4A.

FIG. 6A is a front view of an LCD TV in accordance with a third embodiment of the invention, FIG. 6B is an enlarged cross-sectional view of the LCD TV as taken along a line K-K of FIG. 6A, and FIG. 6C is an enlarged cross-sectional view of the LCD TV taken along a line L-L of FIG. 6A.

FIG. 8A is a front view of an LCD TV in accordance with a fourth embodiment of the invention, FIG. 8B is an enlarged cross-sectional view of the LCD TV as taken along a line M-M of FIG. 8A, and FIG. 8C is an enlarged cross-sectional view of the LCD TV taken along a line N-N of FIG. 8A.

DETAILED DESCRIPTION OF THE EMBODIMENTS

Embodiments of this invention will be described with reference to the accompanying drawings below.

First Embodiment

As shown in FIG. 1A, a liquid crystal display (LCD) television (TV) receiver apparatus 1 in accordance with a first embodiment of this invention is arranged to have a display screen G, on which video images are to be visually displayed. When displaying images on this display screen G, light is emitted to pass through an LCD panel from its backside for displaying video images thereon. The LCD panel has a layer of liquid crystal (LC) material, which is voltage-controlled in accordance with a video image being displayed, and a color filter (not shown) having pixels.

Figure 2:
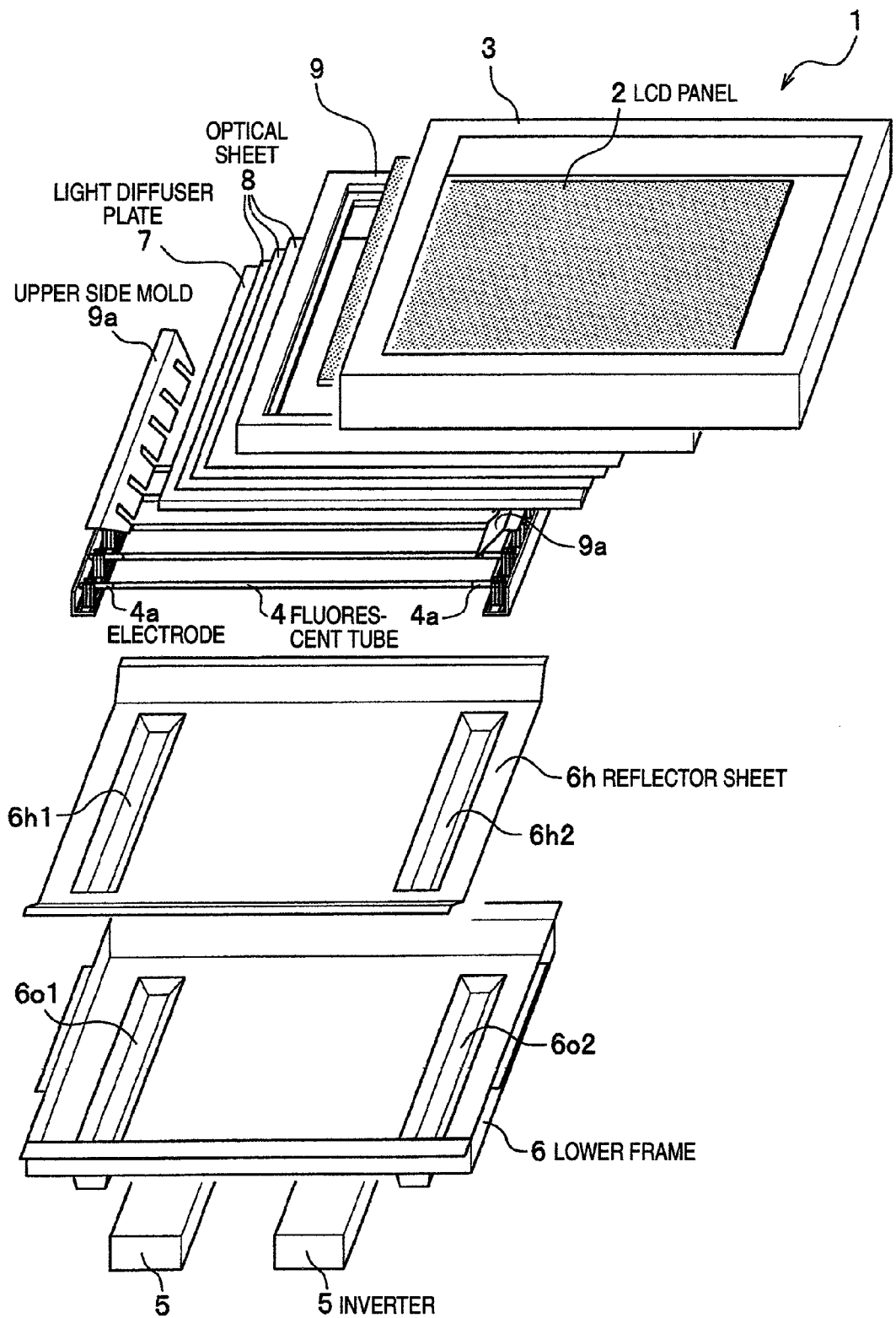
FIG. 2 is an exploded view of the LCD TV shown in FIG. 1A when looking at from its front side.

Note here that FIG. 1A is a diagram showing a front view of the LCD TV 1, FIG. 1B is an enlarged cross-sectional view of the LCD TV as taken along a line G-G of FIG. 1A, and FIG. 1C is an enlarged cross-sectional view of the LCD TV as taken along a line H-H of FIG. 1A. FIG. 2 is an exploded view of the LCD TV 1 shown in FIG. 1A when looking at from its front side (top surface side of drawing sheet of FIG. 1A).
<Arrangement of LCD TV Receiver 1>

As shown in FIGS. 1B and 1C, the LCD TV receiver 1 is generally made up of an LCD panel 2 and an illumination device 1S, which is placed behind the LCD panel 2 for supplying light to the LCD panel 2 from its backside (rear surface of the drawing sheet of FIG. 1A). The LCD panel 2 is rigidly attached to an upper frame 3 (see FIG. 2).

As shown in FIG. 2, the upper frame 3 has a flat rectangular box-like shape having an opening at a part corresponding to the display screen G of the LCD panel 2.

The LCD panel 2 is such that a voltage is applied to the LC layer in a way corresponding to respective pixels constituting a video image to be displayed, for controlling transmission and non-transmission of the incoming light from backside of the illumination device 1S to thereby visually display the video image on the display screen G (see FIG. 1A) by a transmission degree of the light at each pixel of the color filter.
<Arrangement of Illumination Device 1S in LCD TV 1>

As shown in FIGS. 1B and 1C, the illumination device 1S which supplies light to the LCD panel 2 from its backside (rear face of the drawing sheet of FIG. 1A) is arranged to have a plurality of fluorescent tubes 4 for use as a light source unit, an inverter 5 which drives the fluorescent tubes 4, a lower frame 6 which disposes and holds the fluorescent tubes 4, a reflection sheet 6h which is disposed along a front face of the lower frame 6 for permitting reflection of light rays of the fluorescent tubes 4 toward the LCD panel 2 side, a light diffusion plate 7 for diffusing the light that is emitted from the fluorescent tubes 4 toward the LCD panel 2, an optical sheet 8 (generally, more than two optical sheets 8 are present) for control of angular distribution or the like of the light incident on the LCD panel 2, an intermediate frame 9 (see FIG. 2) which is made of a rectangular frame-like resin material for mounting the LCD panel 2 thereon while pressing the optical sheet 8 and light diffusion plate 7 to the lower frame 6, and an upside mold 9a which acts as a light shield wall of the right and left end portions.

The light diffusion plate 7 is configured so that refractivity-different particles are contained therein for causing diffusion or dispersion of the light from the fluorescent tubes 4 which are for use as the light source, thereby preventing an occurrence of brightness irregularities of the illumination device 1S. Note here that in some cases, a pattern which will be described later is formed on a surface of the light diffusion plate 7 for further prevention of such brightness irregularities.

As shown in FIGS. 1B-1C, the lower frame 6 is a reinforcement member which supports the LCD panel 2, illumination device 1S, fluorescent tubes 4 and others. For example, this is manufactured by using a steel plate with a thickness of about 1 mm. As better shown in FIG. 2, this plate is formed to have a low-profile rectangular box-like shape which covers the back surface side of the illumination device 1S and which has an opening in one face on the LCD panel 2 side.

As shown in FIG. 2, at both side portions on the right and left sides of this lower frame 6, concave portions 6o1, 6o2 (see FIGS. 1B-1C) are formed by known press/emboss-machining techniques. Each concave portion is depressed toward the backside (rear face direction of the paper of FIG. 1A) and extends in an up-and-down direction (up-down direction of the paper of FIG. 1A) in such a manner as to allow the light from the fluorescent tubes 4 for use as the light source to reflect toward a reflection sheet 6h to be later described, which is within the concave portion 6o1, 6o2, and reach the right and left ends of the display screen G shown in FIG. 1A.

As shown in FIGS. 1B-1C, the reflection sheet 6h which is disposed on the fluorescent tube 4 side in close proximity to the lower frame 6 is fabricated by use of a sheet of white paper having a thickness of 0.3 mm and reflectivity of 99% or greater for achieving good reflection of the light from the fluorescent tubes 4, for example. This reflection sheet 6h is formed to extend along the shape of the lower frame 6 and has concave portions 6h1, 6h2 along the concave portions 6o1, 6o2 of the lower frame 6.

As shown in FIGS. 1B-1C and 2, the upside mold 9a is molded by using a white-colored resin material which is high in reflectivity and is arranged such that electrodes 4a, 4a at the both ends of a fluorescent tube 4 where no output light rays is emitted are covered with the white resin, and light from the fluorescent tube 4 is reflected at a surface of the white resin having a shape of being slanted backward, i.e., toward the anti-LCD panel 2 side as it goes to the center while the electrodes 4a, 4a are exposed to the LCD panel 2 side, thereby generation of dark brightness unevenness is prevented.

Note here that FIG. 2 depicts main constituent parts or components only, wherein various other members exist therein.

<Traveling of Backlight Within Illumination Device 1S>

As shown in FIGS. 1B-1C, the light that was emitted from the fluorescent tubes 4 for use as the light source enters the reflection sheet 6h and the light diffusion plate 7 and undergoes diffused reflection and thereafter enters either the reflection sheet 6h or the light diffusion plate 7. By repeating this procedure, the light expands within a light diffusion space which is surrounded by the light diffusion plate 7, upside mold 9a and reflection sheet 6h.

As both the reflection sheet 6h and the light diffusion plate 7 are diffused reflection planes, diffused reflection occurs. The light diffusion plate 7 functions to permit the incident light to experience diffused reflection and to return it to the above-noted light diffusion space while simultaneously allowing a certain amount of light to pass through for output to the LCD panel 2 side.

In FIG. 1B, a route along which the light emitted from the fluorescent tubes 4 and output from a point A1 is traveling from a point B1 of the light diffusion plate 7 to the surface of the LCD panel 2 is indicated by arrows, wherein the width of an arrow corresponds to the intensity of such light.

In FIG. 1C, a route along which the light that was emitted from the fluorescent tubes 4 and output from a point C1 is traveling from a point D1 of the light diffusion plate 7 to the surface of LCD panel 2 is indicated by arrows, wherein the width of each arrow corresponds to the intensity of the light.

As previously stated, light undergoes diffused reflection so that this is not simply representable by such a single arrow. However, FIG. 1B or 1C shows, for purposes of convenience in illustration, a light ray that outputs at an angle of 45 degrees, which is "picked up" from those light rays that have output from the point A1 or C1 and are incident on the reflection sheet 6h at the angle of 45 degrees and then undergo the diffused reflection.

Similarly, since the light as output from the reflection sheet 6h at the angle of 45 degrees enters the light diffusion plate 7 at the angle of 45 degrees, a light ray which is reflected at 45 degrees is picked up from those rays which are diffused and reflected at the light diffusion plate 7.

In FIGS. 1B-1C, since the light that entered from a certain direction is reflected to all possible directions, reflected light at a specific angle decreases in light intensity as compared to the incident light (its corresponding arrow becomes slimmer). In short, the more the frequency of reflections, the less the light intensity.

In FIG. 1B, only three reflections are needed for light to travel from the point A1 to the point B1. Similarly, in FIG. 1C, only three reflections are needed for light to reach the point D1 from the point C1.

This is owing to the arrangement which follows: as shown in FIG. 2, the concave portions 6o1, 6o2 are formed in the lower frame 6 by press/emboss machining techniques to have the shape of being depressed backward, i.e., toward the non-display plane side; the concave portions 6h1, 6h2 are formed in the reflection sheet 6h so that each extends along the concave portions 6o1, 6o2; as shown in FIGS. 1B-1C, the distance between the fluorescent tubes 4 and the reflection sheet 6h in the right and left part regions is increased to thereby reduce to three times the frequency of reflection of the light traveling from the point A1 to the point B1 shown in FIG. 1B, while at the same time, to reduce to three times the frequency of reflection of the light traveling from the point C1 to the point D1 shown in FIG. 1C, thereby enabling light to readily reach the right and left ends of the light diffusion plate 7 from the center side.

With this arrangement, the problem that the right and left end part regions of the illumination device 1S—i.e., the right and left end part regions of the display screen G (see FIG. 1A)—are dark is solved without employing a design of extending the length of the fluorescent tubes 4 and increasing the width (concealing dark portions) of the right and left bezel parts 3h, 3m of the upper frame 3 shown in FIG. 1A in order to cover the electrodes 4a, 4a of such lengthened fluorescent tubes 4.

FIG. 3 is a back view showing the main part of the LCD TV 1 shown in FIG. 1A.

As shown in FIGS. 1B-1C and 3, several constituent components are disposed on the non-display plane side of the LCD TV 1, which include electrical circuit members, such as a timing controller Tcon which drives and controls the LCD panel 2, the inverter 5 for driving the fluorescent tubes 4, and a power supply unit E or the like, or other structural members, wherein these components are laid out on backside of the lower frame 6, that is, in a region between the concave portions 6o1, 6o2 each having the shape of extending to the non-display plane side, i.e., in a surface area of the lower frame 6 which has no pressed/embossed portions.

The press/emboss-machining depth of the concave portions 6o1, 6o2 of the lower frame 6 is specifically set to a value that is less than or equal to the thickness of these structural members, such as the inverter 5 and others, whereby it is possible to keep thin the entire body thickness of the LCD TV 1 while at the same time avoiding the darkness of the right and left end portions of the display screen G shown in FIG. 1A, i.e., the right and left ends of the illumination device 1S.

Note here that if the size of extension of the concave portion 6o1, 6o2 of the lower frame 6 toward the non-display plane side is greater than thickness sizes of circuit members, such as the timing controller Tcon, the inverter 5 and the power supply E or other structural members, it is possible to determine the thickness size of the LCD TV 1 by the size of the concave portion 6o1, 6o2 of lower frame 6 extending to the non-display plane side.

Adversely, if the size of extension of the concave portion 6o1, 6o2 of the lower frame 6 toward the non-display plane side is less than the thickness sizes of the circuit members, such as the timing controller Tcon, the inverter 5 and the power supply E, or other structural members, it is possible to define the thickness size of the LCD TV 1 by the thickness sizes of the circuit members, such as the timing controller Tcon, inverter 5 and power supply E, or the other structural members.

Note that although in the first embodiment there is exemplified one specific case where the concave portions 6o1, 6o2 are formed by press/emboss machining methods at the right and left end portions of the lower frame 6, it is also possible to form such concave portion only at at least either one of the right and left ends—for example, only the concave portion 6o1 is formed or, alternatively, only the concave portion 6o2 is formed.

With this arrangement also, similar functions and effects to those of the above-stated first embodiment are achievable.

Also note that although in the first embodiment the explanation was given for the example case where the right and left concave portions 6o1, 6o2 of the lower frame 6 are integrally formed in the lower frame 6 by press/emboss machining techniques, it is also possible to form a similar structure by a process having the steps of forming openings at portions corresponding to the right and left concave portions 6o1, 6o2 of lower frame 6, forming concave portions 6o1, 6o2 by separate parts, and fastening them to the openings by welding or bolt-screwing methods in such a way as to block up these openings.

Second Embodiment

Figure 4A:
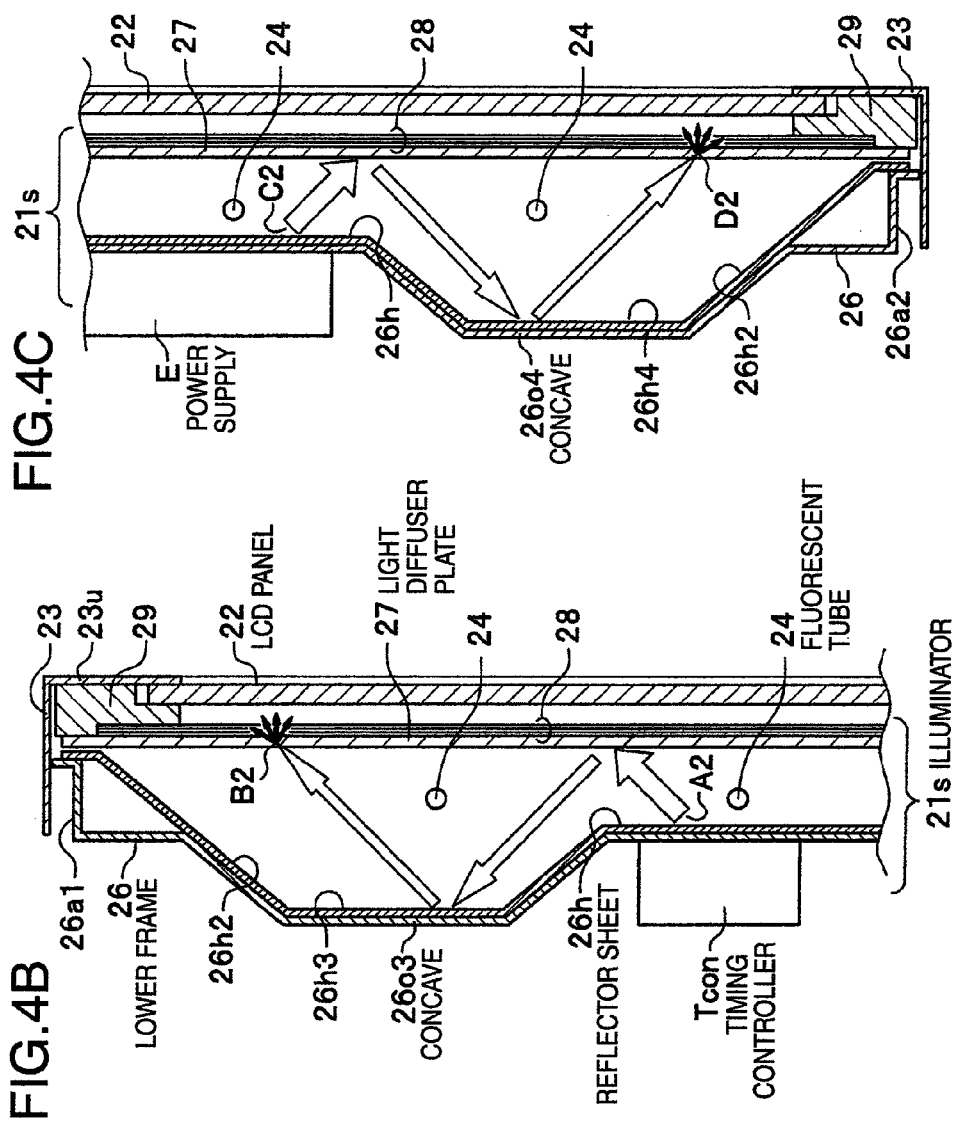
FIG. 4A is a diagram showing a front view of an LCD TV in accordance with a second embodiment of the invention.

FIG. 4A is a diagram showing a front view of an LCD TV receiver 21 in accordance with a second embodiment of the invention, FIG. 4B is an enlarged cross-sectional view of the LCD TV as taken along a line I-I of FIG. 4A, and FIG. 4C is an enlarged cross-sectional view of the LCD TV taken along a line J-J of FIG. 4A.

The LCD TV 21 which is the second embodiment (see FIG. 4A) is the one that has upper and lower concave portions 26o3, 26o4 (see FIGS. 4B-4C) which are formed at the upper and lower end portions of a lower frame 26 in place of the press/emboss-machined right and left concave portions 6o1, 6o2 in the lower frame 6 of the first embodiment, thereby avoiding the darkness of the upper and lower ends of an illumination device 21S.

This embodiment is similar to the first embodiment in arrangements other than the above-noted one, so, similar constituent elements marked with same reference numerals are indicated by numerals, adding 2 to each as a most significant digit, and similar elements marked with the same reference characters are indicated by such same characters, and their detailed explanations are omitted here.

As shown in FIG. 4B, a sidewall part 26a1 which extends toward the backside in the form of a plane is formed at the upper end portion of the lower frame 26. In the case of disposing a reflection sheet 26h along this sidewall part 26a1, light directed to the upper end of the illumination device 21S becomes deficient, resulting in generation of a dark portion(s).

To avoid this, as shown in FIG. 4B, the reflection sheet 26h is formed to have a slanted or "sloped" portion 26h2 which is inclined toward the backside, i.e., to the anti-LCD panel 22 side, as it goes from its upper edge to the center side of the lower frame 26 in the form of being spaced apart from the sidewall part 26a1 of lower frame 26. By forcing the light that is emitted from fluorescent tubes 24, 24, . . . in a central area of the illumination device 21S to be reflected from this sloped portion 26h2 to the upper end side, it is possible to increase the brightness of the illumination device 21S at its upper end and prevent creation of dark portions, resulting in achievement of uniformization of light rays of the illumination device 21S.

Similarly, as shown in FIG. 4C, a sidewall part 26a2 is formed at the lower end of the lower frame 26, which extends planarly toward the backside. In case the reflection sheet 26h is provided along this sidewall part 26a2, the light of the illumination device 21S which approaches the lower end becomes deficient, resulting in occurrence of dark portions.

To avoid this, as shown in FIG. 4C, the reflection sheet 26h is formed to have a slanted portion 26h2 which is inclined toward the backside, i.e., to the anti-LCD panel 22 side, as it goes from its lower edge to the center side of the lower frame 26 in the form of being spaced apart from the sidewall part 26a2 of the lower frame 26. By forcing the light that is emitted from the fluorescent tubes 24, 24, . . . in the central area of the illumination device 21S to be reflected at this sloped portion 26h2 to the lower end side, it is possible to increase the brightness of the illumination device 21S at its lower end and prevent occurrence of dark portions, resulting in achievement of the uniformization of the light of the illumination device 21S.

As shown in FIGS. 4B-4C, the light that emitted from the fluorescent tubes 24 enters the reflection sheet 26h and a light diffusion plate 27 and undergoes diffused reflection, and then enters either the reflection sheet 26h or the light diffusion plate 27. By repeating this procedure, the light expands within a light diffusion space, which is surrounded by the light diffusion plate 27, an upside mold 29a and the reflection sheet 26h.

As both the reflection sheet 26h and the light diffusion plate 27 are diffused reflection planes, diffused reflection occurs. The light diffusion plate 27 serves to cause incident light to undergo diffused reflection and to return it to the above-noted light diffusion space, and at the same time allows a certain amount of light to pass through for output to the LCD panel 22 side.

In FIG. 4B, a route along which the light that was emitted from the fluorescent tubes 24 for outputting from a point A2 is traveling from a point B2 of the light diffusion plate 27 toward the surface of the LCD panel 22 is indicated by arrows, wherein the width of an arrow corresponds to the intensity of such light.

In FIG. 4C, a route along which the light that was emitted from the fluorescent tubes 24 for outputting from a point C2 is traveling from a point D2 of the light diffusion plate 27 toward the surface of LCD panel 22 is indicated by arrows, wherein the width of each arrow corresponds to the intensity of the light.

As previously stated, light undergoes diffused reflection so that this is not simply representable by such a single arrow, However, FIG. 4B or 4C shows, for purposes of convenience in illustration, a light ray that outputs at an angle of 45 degrees, which is "picked up" from those light rays that have output from the point A2 or C2 and are incident on the reflection sheet 26h at the angle of 45 degrees and then undergo the diffused reflection. Similarly, since the light as output from the reflection sheet 26h at the angle of 45 degrees behaves to enter the light diffusion plate 27 at the angle of 45 degrees, a light ray which is reflected at 45 degrees is picked up from those rays which are diffused and reflected at the light diffusion plate 27.

In FIGS. 4B-4C, the incident light that enters from a certain direction is reflected to all possible directions; so, reflected light at a specific angle decreases in light intensity as compared to the incident light (its arrow becomes slimmer). In brief, the more the frequency of reflection, the less the light intensity.

In FIG. 4B, only three reflections are needed for light to travel from the point A2 to the point B2. Similarly, in FIG. 4C, only three reflections are needed for the light to reach the point D2 from the point C2.

This is owing to the arrangement which follows: as shown in FIGS. 4B-4C, the concave portions 26o3, 26o4 are formed by press/emboss machining methods at the upper and lower ends of the lower frame 26, respectively, wherein each concave portion is depressed to the backside, i.e., the non-display plane side; a concave portion 26h3 is formed in the reflection sheet 26h so that it extends along the concave portion 26o3 of the upper end of the lower frame 26; and, a concave portion 26h4 is formed, which is along the concave portion 26o4 of the lower end of lower frame 26.

By increasing the distance between the fluorescent tubes 24 and the lower frame 26 in the upper and lower end part regions in this way, the frequency of reflection of the light that travels from the point A2 to the point B2 shown in FIG. 4B is reduced to three times and, simultaneously, the frequency of reflection of the light that progresses from the point C2 to the point D2 shown in FIG. 4C is reduced to three times, thereby enabling the light to readily reach the upper and lower ends of the light diffusion plate 27 from the center side.

With this arrangement, the problem that the upper and lower end regions of the illumination device 21S are dark is avoidable without increasing the fluorescent tubes 24 in number and increasing the width sizes (concealing dark portions) of an upper bezel part 23$u$ and a lower bezel part 23$s$ of the upper frame 23, which are at upper and lower positions of the display screen G shown in FIG. 4A.

Figure 5:
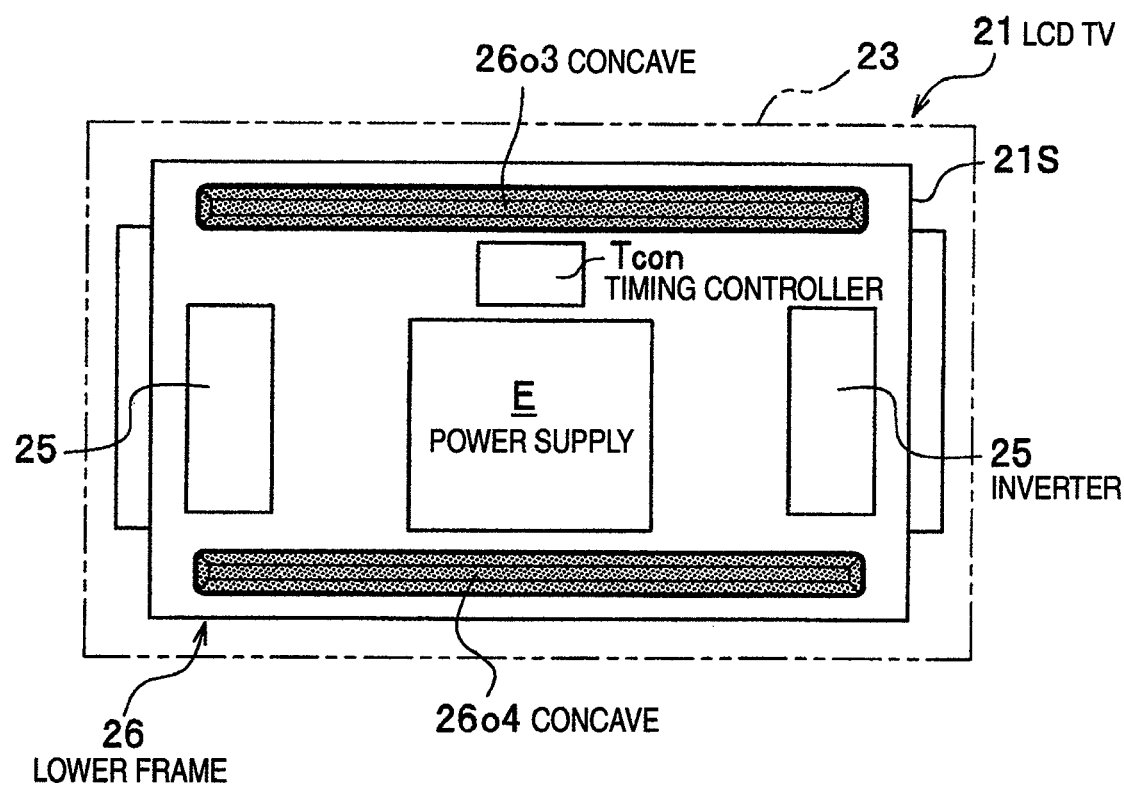
FIG. 5 is a back view showing main part of the LCD TV of the second embodiment shown in FIG. 4A on its back face.

FIG. 5 is a back view showing main part of the LCD TV 21 shown in FIG. 4A.

As shown in FIGS. 4B-4C and 5, several constituent components are disposed on the non-display plane side of the LCD TV 21, which include electrical circuit members, such as a timing controller Tcon, an inverter 25 and a power supply unit E or the like, or other structural members, wherein these components are situated on backside of the lower frame 26, that is, in a region between the concave portions 26$o$3, 26$o$4 each having the shape of extending to the non-display plane side (top surface side of paper of FIG. 5), i.e., in a surface area of the lower frame 26 which has no embossed portions.

The embossing depth of the concave portions 26$o$3, 26$o$4 of the lower frame 26 is set to a value that is less than or equal to the thickness of these structural members, such as the inverter 25 and others, whereby it is possible to keep thin the entire body thickness of the LCD TV 21. This avoids the darkness of the upper and lower ends of the display screen G shown in FIG. 4A, i.e., the upper and lower ends of the illumination device 21S.

Note that it is possible to determine the thickness size of the LCD TV 21 by any longer one of the size of extension of the concave portion 26$o$3, 26$o$4 of the lower frame 26 toward the non-display plane side and the thickness size of electrical circuit members, such as the timing controller Tcon, inverter 25 and power supply E, or other structural members.

Also note that although in the second embodiment there is indicated one exemplary case where the concave portions 26$o$3, 26$o$4 are formed by press/emboss machining methods at the upper and lower ends of the lower frame 26, it is also possible to form such concave portion at at least either one of these upper and lower ends—for example, only the upper concave portion 26$o$3 (see FIGS. 4B and 5) or, alternatively, only the lower concave portion 26$o$4 (see FIGS. 4C and 5) is formed.

With this arrangement also, similar functions and effects to those of the above-stated second embodiment are achieved.

Also note that although in the second embodiment the explanation was given for the example case where the upper and lower concave portions 26$o$3, 26$o$4 of the lower frame 26 are integrally formed in the lower frame 26 by press/emboss machining techniques, it is also possible to form a similar structure by a process having the steps of forming openings at portions corresponding to the upper and lower concave portions 26$o$3, 26$o$4 of lower frame 26, forming concave portions 26$o$3, 26$o$4 by separate parts, and rigidly attaching them to the openings by welding or bolt-screwing methods in such a way as to block up these openings.

Third Embodiment

FIG. 6A is a front view of an LCD TV receiver 31 in accordance with a third embodiment of the invention, FIG. 6B is an enlarged cross-sectional view of the LCD TV as taken along a line K-K of FIG. 6A, and FIG. 6C is an enlarged cross-sectional view of the LCD TV taken along a line L-L of FIG. 6A.

The LCD TV 31 (see FIG. 6A) which is a display apparatus of the third embodiment is the one that forms, in a lower frame 36 of the third embodiment, the embossed concave portions 6$o$1, 6$o$2 (see FIGS. 1A-1C and 3) of the right and left ends of the lower frame 6 of the first embodiment and the embossed concave portions 26$o$3, 26$o$4 (see FIGS. 4A-4C and 5) of the upper and lower ends of the lower frame 26 of the second embodiment as embossed right and left concave portions 36$o$1, 36$o$2 and embossed upper and lower concave portions 36$o$3, 36$o$4 (see FIGS. 6B and 6C).

The third embodiment is similar to the first and second embodiments in arrangements other than the above-noted arrangement, so, similar constituent elements with identical reference numerals are indicated by numerals, adding 3 to each as a most significant digit, and similar elements marked with the same reference characters are indicated by such same characters, with detailed explanations being omitted here.

In FIG. 6B, a route along which the light that was emitted from fluorescent tubes 34 for outputting from a point A3 is output from a point B3 of a light diffusion plate 37 toward the surface of an LCD panel 32 is indicated by arrows, wherein the width of an arrow corresponds to the intensity of such light.

In FIG. 6C, a route along which the light that was emitted from the fluorescent tubes 34 for outputting from a point C3 is traveling from a point D3 of the light diffusion plate 37 toward the surface of LCD panel 32 is indicated by arrows, wherein the width of each arrow corresponds to the intensity of the light.

As previously stated, light undergoes diffused reflection so that this is not simply representable by such a single arrow. However, FIG. 6B or 6C shows, for purposes of convenience in illustration, a light ray that outputs at an angle of 45 degrees, which is "picked up" from those light rays that have output from the point C3 or C4 and are incident on a reflection sheet 36$h$ at the angle of 45 degrees and then undergo the diffused reflection.

Similarly, since the light as output from the reflection sheet 36$h$ at the angle of 45 degrees enters the light diffusion plate 37 at the angle of 45 degrees, a light ray which is reflected at 45 degrees is picked up from those rays which are diffused and reflected from the light diffusion plate 37.

In FIG. 6B, only three reflections are needed for light to travel from the point A3 to the point B3. Similarly, in FIG. 6C, only three reflections are needed for the light to reach the point D3 from the point C3.

Regarding this feature, the case of the left end and upper end of the illumination device 31S was explained. However, the right end and lower end of the illumination device 31S are arranged in a similar way thereto.

Figure 7:
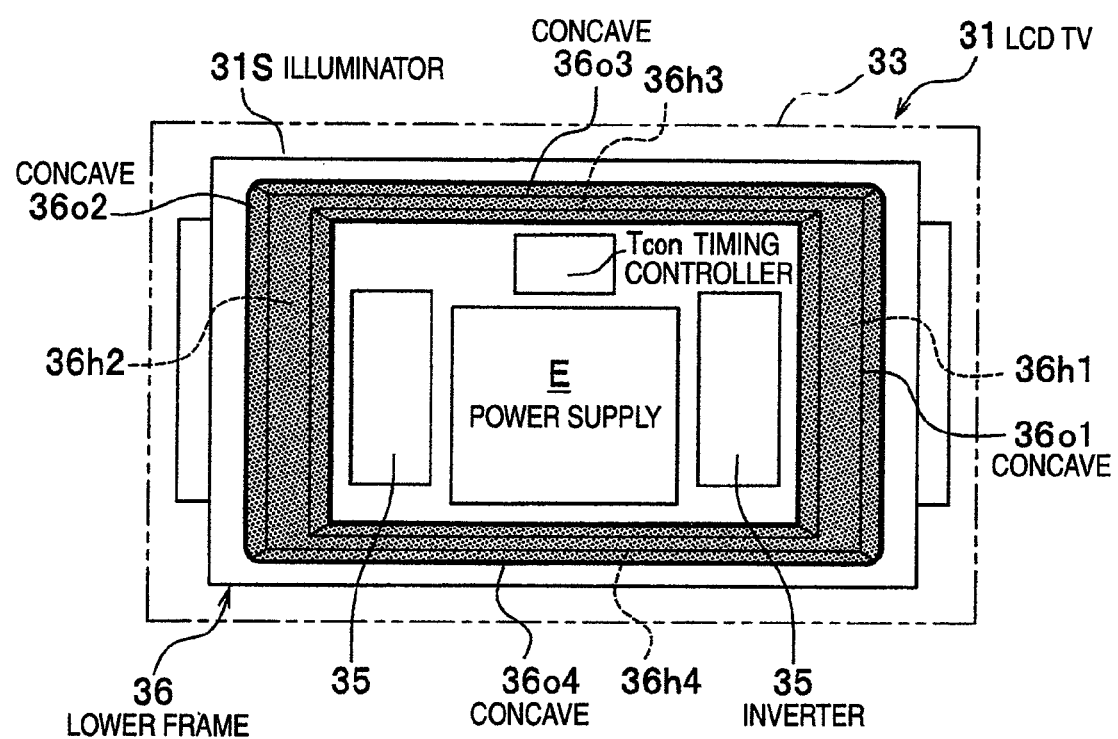
FIG. 7 is a back view showing main part of the LCD TV shown in FIG. 6A on its backface.

FIG. 7 is a back view showing main part of the LCD TV shown in FIG. 6A on its backface.

As shown in FIGS. 6B-6C and 7, the concave portions 36$o$1, 36$o$2, 36$o$3, 36$o$4 are formed by press/emboss machining methods at the right and left ends and the upper and lower ends of the lower frame 36, respectively, wherein each has a shape of being depressed toward the backside, i.e., the non-display plane side, while forming in the reflection sheet 36$h$ a set of concave portions 36$h$1, 36$h$2, 36$h$3, 36$h$4 which are along the concave portions 36$o$1, 36$o$2, 36$o$3, 36$o$4 to thereby increase the distance between fluorescent tubes 34 and the reflection sheet 36$h$ in the right and left end part regions as shown in FIGS. 6B-6C, thus enabling the light of the fluorescent tubes 34 on the center side to easily reach the right and left ends and the upper and lower ends of the light diffusion plate 37.

With this arrangement, the problem that the right and left end part regions of the illumination device 31S are dark is solvable without employing a design of extending the length of the fluorescent tubes and increasing the width of the right and left bezel parts 33*h*, 33*m* (see FIG. 6A) of an upper frame 33 in order to cover the electrode parts of the lengthened fluorescent tubes.

In addition, the problem that the upper and lower end part regions of the illumination device 31S are dark is avoidable without increasing the fluorescent tubes 34 in number and increase the width sizes of an upper bezel part 33*u* and a lower bezel part 33*s* of the upper frame 33 shown in FIG. 6A.

As shown in FIGS. 6B-6C and 7, structural members are laid out on the non-display plane side of the LCD TV 31 in a surface area between the concave portions 36*o*1, 36*o*2, 36*o*3, 36*o*4 each having the shape of extending toward the backside of the lower frame 36, i.e., the non-display plane side (top surface side of drawing sheet of FIG. 7), that is, in a region of the lower frame 36 which is free from the emboss machining, wherein the structural members include electrical circuit components, such as a timing controller Tcon, an inverter 35, a power supply E and others.

By causing an emboss-machining depth of the concave portion 36*o*1, 36*o*2, 36*o*3, 36*o*4 of the lower frame 36 to be less than or equal to the thickness of these circuit components, such as the inverter 35 or else, it is possible to permit the LCD TV 31 to stay less in its entire thickness. It is also possible to avoid the darkness of the right and left ends and the upper and lower ends of display screen G, i.e., the darkness of the right and left ends and upper and lower ends of the illumination device 31S.

Note here that it is possible to determine the thickness size of the LCD TV 31 by any longer one of the size of the concave portion 36*o*1, 36*o*2, 36*o*3, 36*o*4 of the lower frame 36 extending to the backside, i.e., the non-display plane side, and the thickness size of the circuit members, such as the timing controller Tcon, inverter 35, and power supply E, or other structural components.

Also note that although in the third embodiment the explanation was given for the example case where the concave portions 36*o*1, 36*o*2, 36*o*3, 36*o*4 at the upper/lower and right/left ends of the lower frame 36 are integrally formed in the lower frame 36 by press/emboss machining techniques, it is also possible to form a similar structure by a method having the steps of forming a main body of the lower frame 36 and the concave portions 36*o*1, 36*o*2, 36*o*3, 36*o*4 by separate parts and fastening together the main body of lower frame 36 and the concave portions 36*o*1, 36*o*2, 36*o*3, 36*o*4 by welding or bolt-screwing techniques.

Fourth Embodiment

FIG. 8A is a front view of an LCD TV 41 of a fourth embodiment of the invention, FIG. 8B is an enlarged cross-sectional view of the LCD TV as taken along a line M-M of FIG. 8A, and FIG. 8C is an enlarged cross-sectional view of the LCD TV taken along a line N-N of FIG. 8A.

Figure 9:
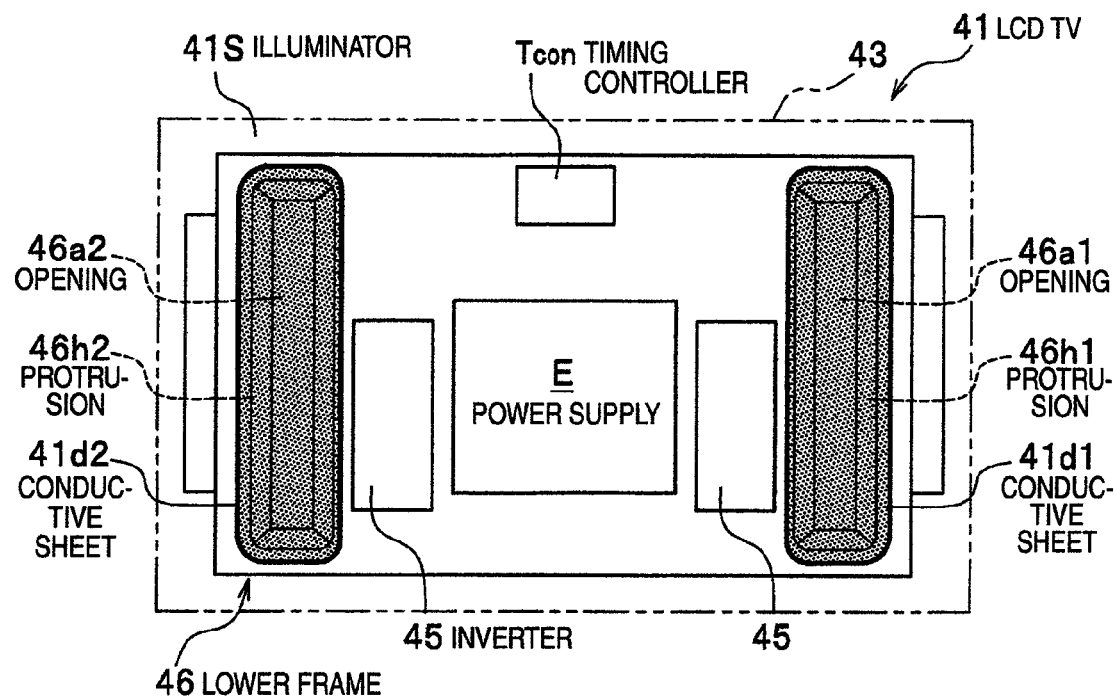
FIG. 9 is a back view showing main part of the LCD TV of the fourth embodiment shown in FIG. 8A on its backface.

FIG. 9 is a back view showing main part of the LCD TV 41 of the fourth embodiment shown in FIG. 8A on its backface.

The LCD TV 41 (see FIG. 8A) which is a display apparatus of the fourth embodiment is arranged to define openings at the same locations as the emboss-machined concave portions 6*o*1, 6*o*2 at the right and left ends of the lower frame 6 in the first embodiment to thereby form openings 46*a*1, 46*a*2.

Then, a reflection sheet 46*h* is formed to have a protrusion portion 46*h*1 which is protruded from the opening 46*a*1 toward the backside, i.e., anti-LCD panel 42 side; simultaneously, a protrusion 46*h*2 that is protruded from the opening 46*a*2 to the backside is formed.

Whereby, an arrangement is provided for expanding the distance between fluorescent tubes 44 and the reflection sheet 46*h*, i.e., the distance between the fluorescent tubes 44 and the protrusion 46*h*1 of reflection sheet 46*h* and also the distance between the fluorescent tubes 44 and the protrusion 46*h*2 of the reflection sheet 46*h*.

The fourth embodiment is similar to the first embodiment in arrangements other than the above-noted one, so, similar constituent elements with same reference numerals are indicated by numerals, adding 4 to each as a most significant digit, and similar elements marked with the same reference characters are indicated by such same characters, with their detailed explanations being omitted.

Actually, in the case of defining the openings in the lower frame 46 to form the openings 46*a*1, 46*a*2, electromagnetic waves are generated by discharge of the fluorescent tubes 44 to come and go through these openings 46*a*1, 46*a*2. This will possibly affect operations of the circuit components mounted on the non-display plane shown in FIG. 9, such as the inverter 45, timing controller Tcon, etc.

One known remedy for this electromagnetic interference (EMI) is to overlay an electrical conductive sheet 41*d*1 on the backface side, i.e., rear side, of the protrusion 46*h*1 of the reflection sheet 46*h* for covering the opening 46*a*1 defined in the lower frame 46 as shown in FIGS. 8B and 9 to thereby shield inside/outside spaces of the opening 46*a*1.

Similarly, as shown in FIGS. 8C and 9, a conductive sheet 41*d*2 is overlaid on the backface side, i.e., rear side, of the protrusion 46*h*2 of the reflection sheet 46*h* to cover the opening 46*a*2 defined in the lower frame 46 as shown in FIGS. 8C and 9, thereby shielding internal/external spaces of the opening 46*a*2.

By providing the conductive sheets 41*d*1, 41*d*2 in this way, it is possible to prevent or at least greatly suppress external leakage of electromagnetic waves due to the discharge of the fluorescent tubes 44. This makes it possible to avoid bad influence on the circuit components, such as the inverter 45, timing controller Tcon or the like.

Except this arrangement, the fourth embodiment is similar in structure to the first embodiment, so that it offers similar functions and effects to those of the first embodiment.

Note that although in the fourth embodiment the structural design for providing the above-stated arrangements at the right and left ends of the illumination device 41S has been described, such arrangements may alternatively be provided at the upper and lower ends of the illumination device 41S, rather than the right and left ends thereof.

In addition, the arrangement may be provided at only one of the right and left ends or the upper and lower ends of the illumination device 41S. Alternatively, the arrangements may be provided at the right/left ends and the upper/lower ends of the illumination device 41S.

In these cases also, the above-stated functions and effects are achievable in a similar way.

Fifth Embodiment

Figure 10:
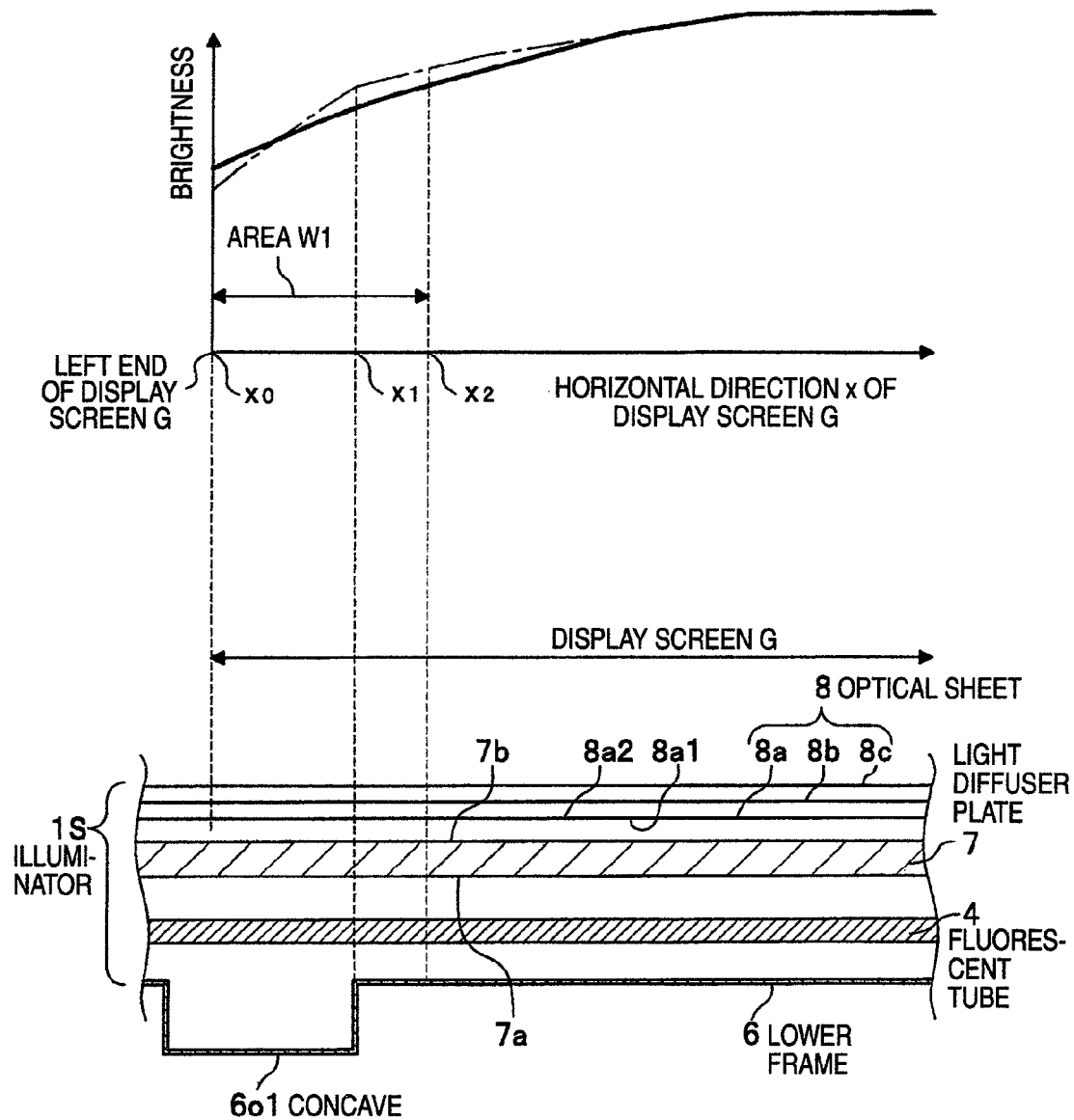
FIG. 10 is an enlarged cross-sectional illustration diagram along a line G-G of FIG. 1A while showing a relationship of the brightness of light versus position in the lateral direction of a display screen of an illumination device.

FIG. 10 is an enlarged cross-sectional illustration along a line G-G of FIG. 1A for showing a relationship of the brightness of light versus position along the lateral direction (horizontal direction of the drawing sheet of FIG. 1A) of the display screen G in the illumination device 1S.

It is apparent from viewing FIG. 10 that the brightness of light rapidly falls down as indicated by a dash-and-dot line in a region expanding from a boundary position x1 between the center side of the lower frame 6 and the concave portion 6o1 up to the concave portion 6o1 of lower frame 6.

Figure 11A:
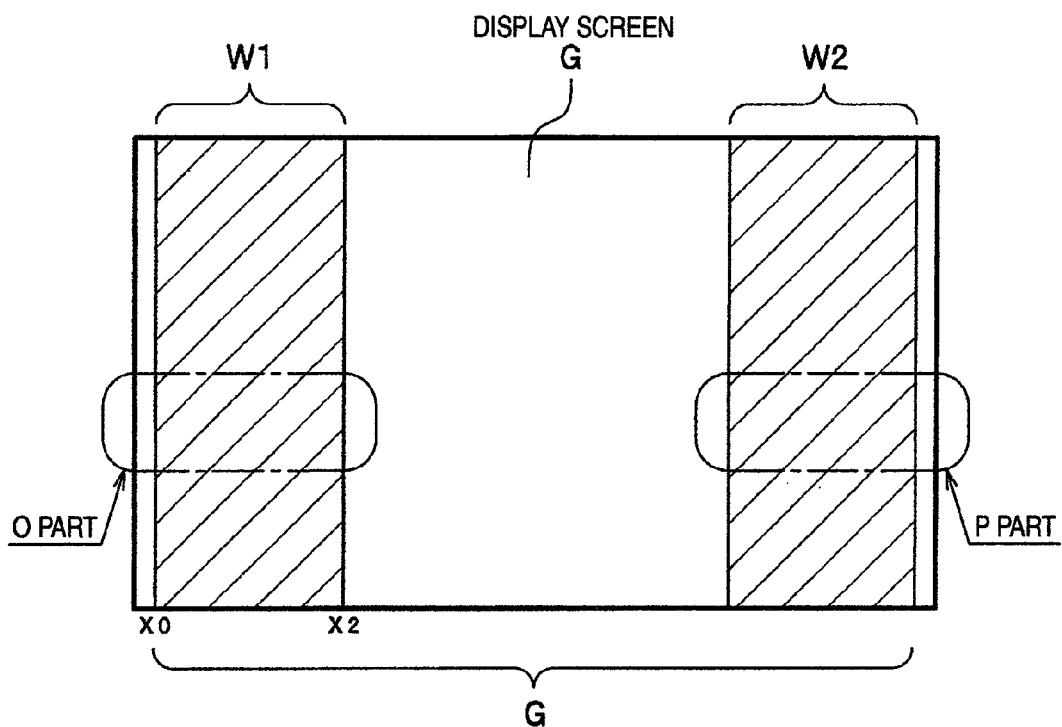
FIG. 11A is a diagram showing regions W1 and W2 with a print pattern being formed on a light diffusion plate or an optical sheet in the display screen shown in FIG. 1A.
Figure 11B:
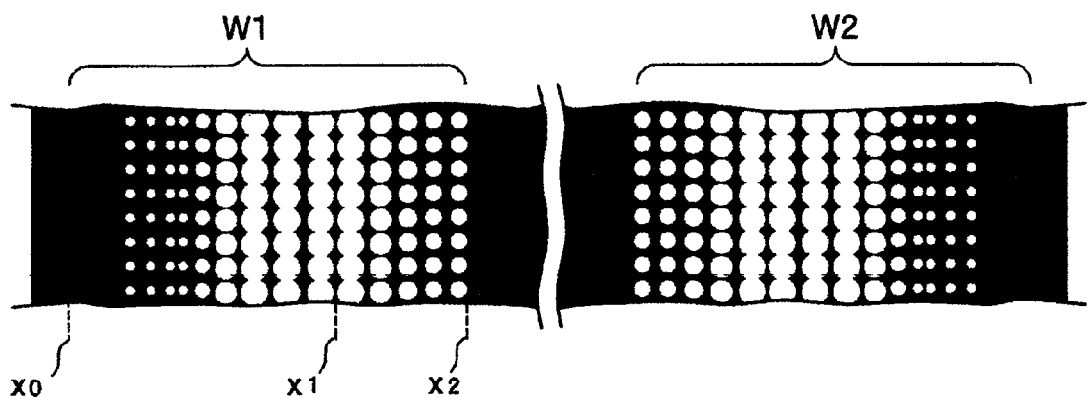
FIG. 11B is a diagram showing the print pattern of an "O" part of FIG. 11A and also showing the print pattern at "P" part of FIG. 11A.
Figure 12A:
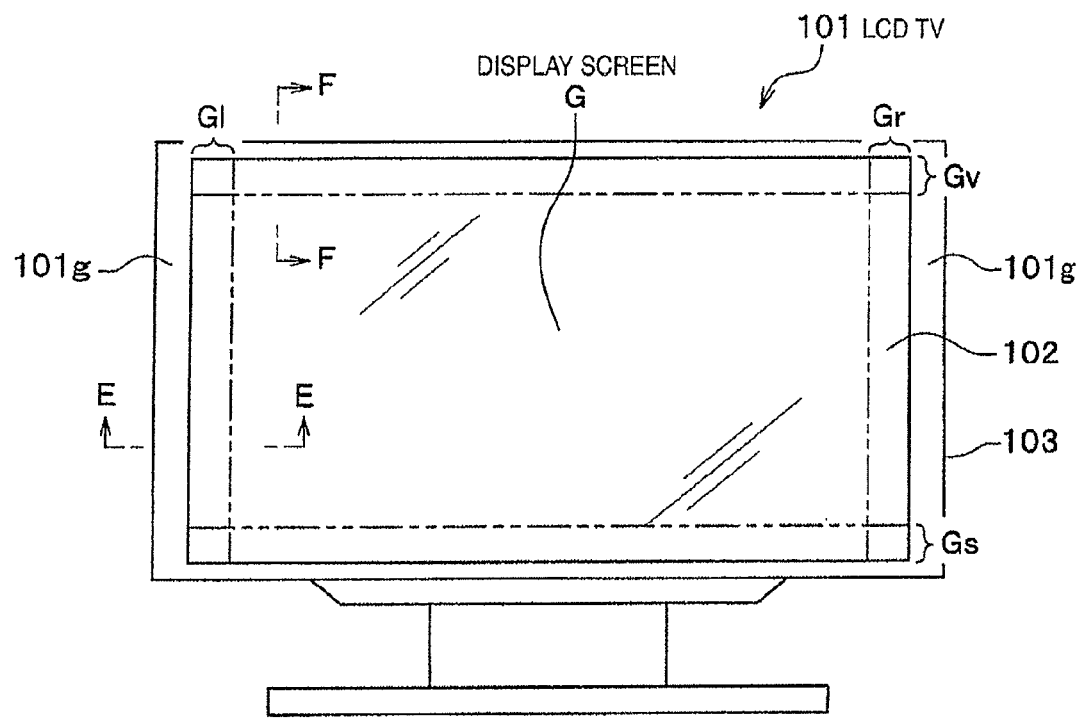
FIG. 12A is a front view of a prior known LCD TV.
Figure 12B:
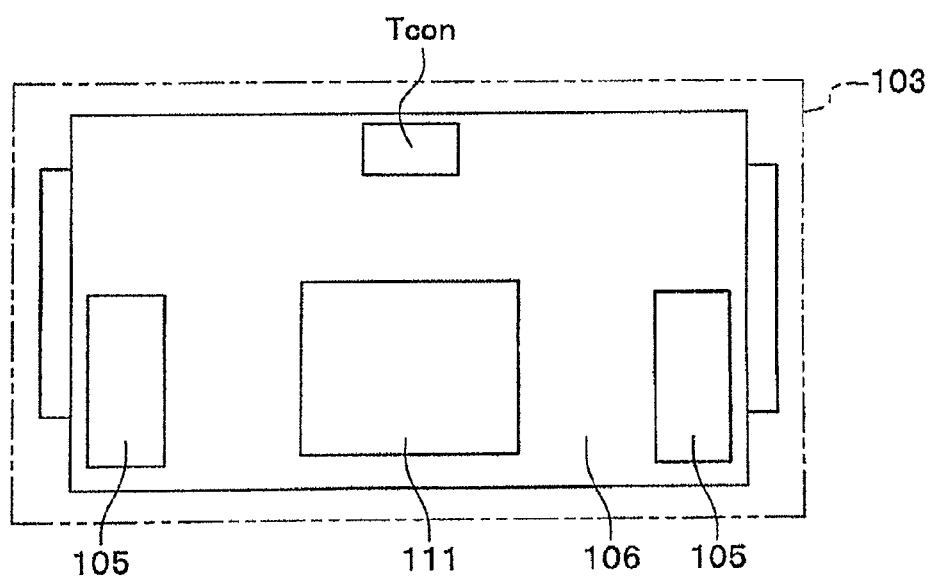
FIG. 12B is a back view showing main part of the LCD TV shown in FIG. 12A on its backface.
Figure 13A:
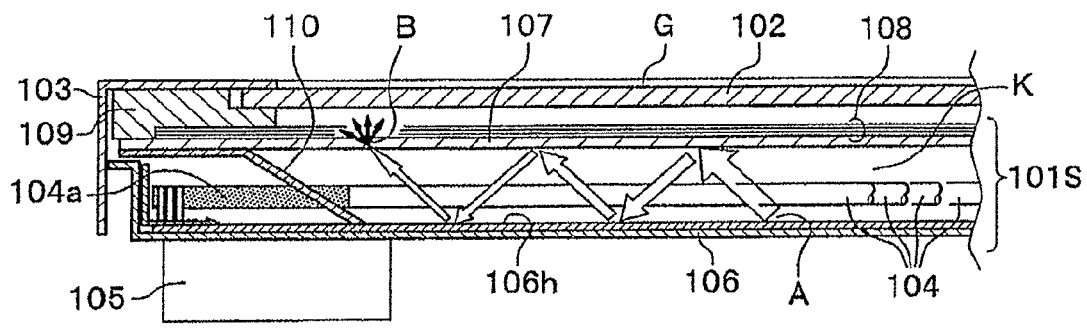
FIG. 13A is an enlarged cross-sectional view of the prior art LCD TV as taken along a line E-E of FIG. 12A.
Figure 13B:
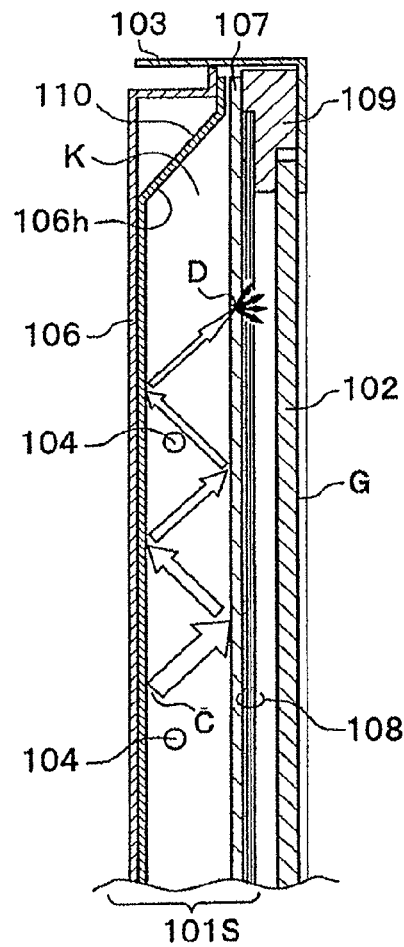
FIG. 13B is an enlarged cross-sectional view of the LCD TV taken along a line F-F of FIG. 12A.
Figure 14:
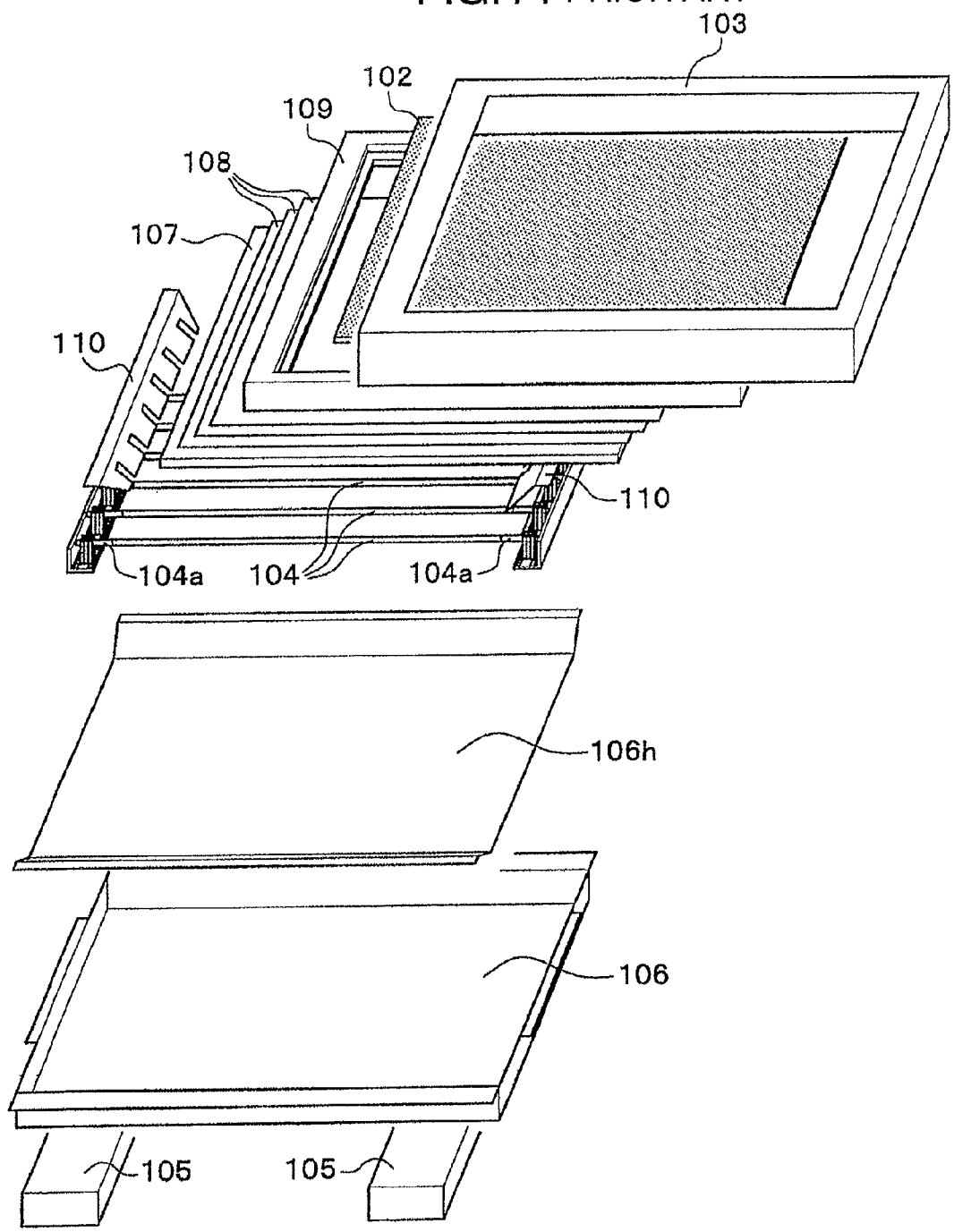
FIG. 14 is an exploded view of the prior art LCD TV shown in FIG. 12A when looking at from its front side.

To cope with this phenomenon, a white-dot print pattern that uses white color ink shown in FIG. 11B is formed in a region W1 (see FIGS. 10 and 11A) which is from a left-side end portion x0 of the display screen G on either a surface 7a on the fluorescent tube 4 side of the light diffusion plate 7 shown in FIG. 10 or a surface 8a1 on the light diffusion plate 7 side of the optical sheet 8 up to a center-side position x2 which exceeds the center-side boundary x1 of the concave portions 6o1 of lower frame 6.

This white-dot print pattern is the one that partially suppresses the light of the fluorescent tubes 4 due to reflection and, at the same time, illuminates dark portions by such reflected light to thereby prevent rapid change in brightness of the light.

Additionally, FIG. 11A is a diagram showing regions W1 and W2 with the print pattern being formed on the light diffusion plate 7 or the optical sheet 8 at the display screen G shown in FIG. 1A, and FIG. 11B is a diagram showing a print pattern of an O portion of FIG. 11A and also showing a print pattern at P portion of FIG. 11A.

As shown in FIG. 11B, the white-dot print pattern is such that middle-sized white dots are formed in an area extending from the center-side position x2 to the terminate end side, wherein the position x2 is more closer to the center side than the center-side boundary x1 of the concave portion 6o1 of the lower frame 6 shown in FIG. 10; large-size white dots are formed in an area of from a nearby position of the center-side boundary x1 of the concave portion 6o1 of the lower frame 6 up to the end part side; and, small-size white dots are formed in an area covering from an almost mid location of the concave portion 6o1 region of lower frame 6 up to the terminate end side. The formation of these small-size white dots is stopped on near side of the left end position x0 of the display screen G.

By forming this white-dot print pattern, it becomes possible to moderate the change in light brightness as indicated by a solid line of FIG. 10.

Note here that as shown in FIGS. 11A and 11B, similar effects are obtainable by forming a similar white-dot print pattern in a region W2 on the display screen G, which region is bilaterally symmetrical with the region W1.

Also note that in the case of forming the concave portions 26o3, 26o4 at the upper and lower ends of the lower frame 26 as shown in FIGS. 4A-4C of the second embodiment, it is possible, in a similar manner to the solid line of FIG. 10, to moderate the change in light brightness by forming similar white-dot print patterns at the upper and lower end parts.

Obviously, it is also possible to form the above-stated print pattern at at least either one of the right and left ends or the upper and lower ends.

Although in the fifth embodiment the case of using the white ink is explained as an example, any available ink of other colors except the white-color ink may be used as far as this ink is high in reflectivity.

Additionally, although in the fifth embodiment the explanation was given by taking as an example the case of forming the white-dot print pattern on either the surface 7a on the fluorescent tube 4 side of the light diffusion plate 7 or the surface 8a1 on the light diffusion plate 7 side of the optical sheet 8, certain effects are obtainable even when forming the white-dot print pattern at other locations; for example, on a surface 7b on the fluorescent tube 4 side of the light diffusion plate 7 or a surface 8a2 of the optical sheet 8a or on an optical sheet(s) 8b, 8c.

While the first to fifth embodiments have been explained individually, arrangements of any ones of the first to fifth embodiments may be selected appropriately for use in combination when the need arises.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An illumination device comprising:
a fluorescent tube;
a lower frame member, configured to support the fluorescent tube;
a light diffusion member disposed opposite to the lower frame member with the fluorescent tube being interposed therebetween, the light diffusion member configured to diffuse light from the fluorescent tube toward an anterior object to be illuminated;
a reflection sheet member disposed along a side of the lower frame member that faces the fluorescent tube, the reflection sheet member configured to reflect light from the fluorescent tube toward the light diffusion member; and
an upside reflection member, configured to cover an electrode of the fluorescent tube and configured to reflect the light from the fluorescent tube to the light diffusion member,
wherein when a horizontal direction is defined as a lengthwise direction of the fluorescent tube, and left end and right end are defined in relation to the horizontal direction, the lower frame member includes at least one of a concave protrusion disposed proximate to a right end of the illumination device and a concave protrusion disposed proximate to a left end of the illumination device, with each of the concave protrusion or protrusions of the lower frame member protruding away from the anterior object to be illuminated;
wherein for each of the concave protrusion or protrusions of the lower frame member, the reflection sheet member is disposed thereon, along the side facing the fluorescent tube; and
wherein a distance between the fluorescent tube and the reflection sheet member at a concave protrusion is greater than a distance between the fluorescent tube and the reflection sheet member at the central portion of the illumination device.

2. An illumination device according to claim 1, wherein one or more structural members, including at least one of an inverter and a power supply, the one or more structural members being disposed on the lower frame member, on a face of the lower frame member that faces away from the anterior object to be illuminated, but not on a concave protrusion of the lower frame member.

3. An illumination device according to claim 1, wherein a distance of a concave protrusion of the reflection sheet member into the concave protrusion of the lower frame member is not larger than a thickness of the thickest of the one or more structural members, including at least one of an inverter and a power supply, the one or more structural members being disposed on the lower frame member, on a face of the lower frame member that faces away from the anterior object to be illuminated.

4. An illumination device according to claim 1, wherein a concave protrusion of the lower frame member is covered with an electrically conductive sheet member.

5. An illumination device according to claim 1, wherein a print pattern is disposed on at least one of (1) the light diffusion member, and (2) an optical sheet interposed between the light diffusion member and the anterior object to be illuminated, the print pattern being disposed in a region proximate to a concave protrusion of the reflection sheet member.

6. An illumination device according to claim 5, wherein the print pattern is disposed on a surface of the light diffusion member that faces the fluorescent tube.

7. An illumination device according to claim 5, wherein the print pattern is disposed on a surface of the optical sheet member.

8. A display apparatus comprising the illumination device as recited in claim 1.

9. An illumination device according to claim 1,
wherein the lower frame member includes both a concave protrusion disposed proximate to the left end of the illumination device and a concave protrusion disposed proximate to the right end of the illumination device, and the concave protrusions are disposed to protrude away from the anterior object to be illuminated;
wherein for each of the concave protrusion or protrusions of the lower frame member, the reflection sheet member is disposed thereon, along the side facing the fluorescent tube.

10. An illumination device comprising:
a plurality of fluorescent tubes;
a lower frame member, configured to support the fluorescent tubes;
a light diffusion member disposed opposite to the lower frame member with the fluorescent tubes being interposed therebetween, the light diffusion member configured to diffuse light from the fluorescent tubes toward an anterior object to be illuminated;
a reflection sheet member disposed along a side of the lower frame member that faces the fluorescent tubes, the reflection sheet member configured to reflect light from the fluorescent tubes toward the light diffusion member; and
an upside reflection member, configured to cover an electrode of the fluorescent tubes and configured to reflect the light from the fluorescent tubes to the light diffusion member,
wherein when a vertical direction is defined as a direction perpendicular to a lengthwise direction of the fluorescent tubes configured to extend along a surface of the reflection sheet member, and upper end and lower end are defined in relation to the vertical direction, the lower frame member includes at least one of a concave protrusion disposed proximate to an upper end of the illumination device and a concave protrusion disposed proximate to a lower end of the illumination device, with each of the concave protrusion or protrusions of the lower frame member protruding away from the anterior object to be illuminated;
wherein for each of the concave protrusion or protrusions of the lower frame member, the reflection sheet member is disposed thereon, along the side facing the fluorescent tubes; and
wherein a distance between a fluorescent tube of said plurality of florescent tubes and the reflection sheet member at each of the concave protrusion or protrusions is greater than a distance between another of said plurality of fluorescent tubes and the reflection sheet member at the central portion of the illumination device.

11. A display apparatus comprising the illumination device as recited in claim 10.

12. An illumination device according to claim 10,
wherein the lower frame member includes both a concave protrusion disposed proximate to the upper end of the illumination device and a concave protrusion disposed proximate to the lower end of the illumination device, and the concave protrusions are disposed to protrude away from the anterior object to be illuminated;
wherein for each of the concave protrusion or protrusions of the lower frame member, the reflection sheet member is disposed thereon, along the side facing the fluorescent tubes.

13. An illumination device according to claim 10, wherein a concave protrusion of the lower frame member is covered with an electrically conductive sheet member.

14. An illumination device according to claim 10, wherein a print pattern is disposed on at least one of (1) the light diffusion member, and (2) an optical sheet interposed between the light diffusion member and the anterior object to be illuminated, the print pattern being disposed in a region proximate to a concave protrusion of the reflection sheet member.

15. An illumination device according to claim 10, wherein a distance of a concave protrusion of the reflection sheet member into the concave protrusion of the lower frame member is not larger than a thickness of the thickest of the one or more structural members, including at least one of an inverter and a power supply, the one or more structural members being disposed on the lower frame member, on a face of the lower frame member that faces away from anterior object to be illuminated.

16. An illumination device comprising:
a plurality of fluorescent tubes;
a lower frame member, configured to support the fluorescent tubes;
a light diffusion member disposed opposite to the lower frame member with the fluorescent tubes being interposed therebetween, the light diffusion member configured to diffuse light from the fluorescent tubes toward an anterior object to be illuminated;
a reflection sheet member disposed along a side of the lower frame member that faces the fluorescent tubes, the reflection sheet member configured to reflect light from the fluorescent tubes toward the light diffusion member; and
an upside reflection member, configured to cover an electrode of the fluorescent tubes and configured to reflect the light from the fluorescent tubes to the light diffusion member,
wherein when a horizontal direction is defined as a lengthwise direction of the fluorescent tubes, and left end and right end are defined in relation to the horizontal direction, and when a vertical direction is defined as a direction perpendicular to a lengthwise direction of the fluorescent tubes configured to extend along a surface of the reflection sheet member, and upper end and lower end are defined in relation to the vertical direction, the lower frame member includes a concave protrusion disposed proximate to an upper end, a lower end, a right end, and a left end of the illumination device, or a plurality of concave protrusions that in combination are disposed proximate to an upper end, a lower end, a right end, and a left end of the illumination device, with each of the concave protrusion or protrusions of the lower frame member protruding away from the anterior object to be illuminated;

wherein for each of the concave protrusion or protrusions of the lower frame member, the reflection sheet member is disposed thereon, along the side facing the fluorescent tubes; and wherein a distance between at least one of the plurality of fluorescent tubes and the reflection sheet member at the right end and left end concave protrusion is greater than a distance between said at least one fluorescent tube and the reflection sheet member at the central portion of the illumination device.

17. A display apparatus comprising the illumination device as recited in claim 16.

18. An illumination device according to claim 16, wherein the lower frame member includes a single concave protrusion disposed proximate to an upper end, a lower end, a right end, and a left end of the illumination device;

wherein for the single concave protrusion of the lower frame member, the reflection sheet member is disposed thereon, along the side facing the fluorescent tubes.

19. An illumination device according to claim 16, wherein a concave protrusion of the lower frame member is covered with an electrically conductive sheet member.

20. An illumination device according to claim 16, wherein a print pattern is disposed on at least one of (1) the light diffusion member, and (2) an optical sheet interposed between the light diffusion member and the anterior object to be illuminated, the print pattern being disposed in a region proximate to a concave protrusion of the reflection sheet member.

21. An illumination device according to claim 16, wherein a distance of a concave protrusion of the reflection sheet member into the concave protrusion of the lower frame member is not larger than a thickness of the thickest of the one or more structural members, including at least one of an inverter and a power supply, the one or more structural members being disposed on the lower frame member, on a face of the lower frame member that faces away from the anterior object to be illuminated.

22. An illumination device according to claim 16, wherein a distance between a fluorescent tube of said plurality of florescent tubes and the reflection sheet member at each of the upper end and lower end concave protrusion or protrusions is greater than a distance between another of said fluorescent tubes and the reflection sheet member at the central portion of the illumination device.

* * * * *